(12) United States Patent
Shiobara et al.

(10) Patent No.: US 6,304,248 B1
(45) Date of Patent: Oct. 16, 2001

(54) COORDINATE INPUT DEVICE

(75) Inventors: Tomomi Shiobara; Tsuyoshi Niwata, both of Kawasaki; Takeo Hirashima, Hachioji, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/086,951

(22) Filed: May 29, 1998

(30) Foreign Application Priority Data

Dec. 12, 1997 (JP) .................................................... 9-342627

(51) Int. Cl.[7] ....................................................... G09G 5/08
(52) U.S. Cl. ................................................................ 345/163
(58) Field of Search ............................................. 345/163

(56) References Cited

U.S. PATENT DOCUMENTS

| | | | |
|---|---|---|---|
| H1794 | * 4/1999 | Claus ................................. | 235/380 |
| 5,341,421 | 8/1994 | Ugon ................................. | 380/4 |
| 5,457,480 | * 10/1995 | White ................................ | 345/163 |
| 5,550,561 | * 8/1996 | Ziarno ............................... | 345/163 |
| 5,584,043 | 12/1996 | Burkart . | |
| 5,802,502 | * 9/1998 | Gell et al. ......................... | 705/37 |
| 5,841,122 | * 11/1998 | Kirchhoff .......................... | 235/492 |
| 5,895,902 | * 4/1999 | Ziarno ............................... | 235/380 |
| 5,982,302 | * 11/1999 | Ure .................................... | 341/22 |
| 6,070,796 | * 6/2000 | Sirbu ................................. | 235/382 |

FOREIGN PATENT DOCUMENTS

| | | |
|---|---|---|
| 2 738 070 | 2/1997 | (FR) . |
| WO97/07448 | 2/1997 | (WO) . |

* cited by examiner

*Primary Examiner*—Jeffery Brier
*Assistant Examiner*—Ryan Yang
(74) *Attorney, Agent, or Firm*—Armstrong, Westerman, Hattori, McLeland & Naughton, LLP

(57) ABSTRACT

A coordinate input device includes coordinate detecting elements for detecting input coordinates, operating elements for generating operational information corresponding to a predetermined operation and a communication element for transmitting data of said input coordinates detected by said coordinate detecting elements and said operational information generated by an operation of said operating elements to a processing device. The coordinate input device further comprises an IC card access element for allowing an access to an IC card.

10 Claims, 18 Drawing Sheets

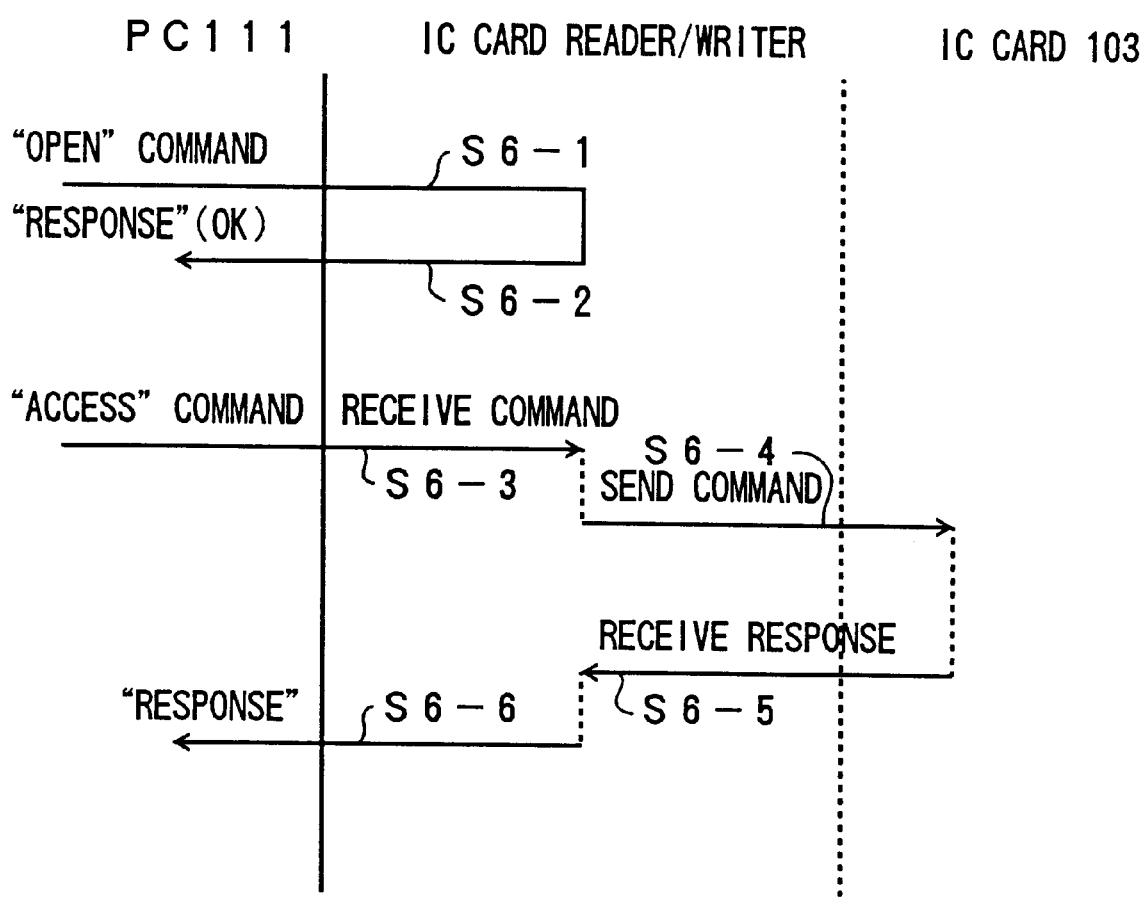

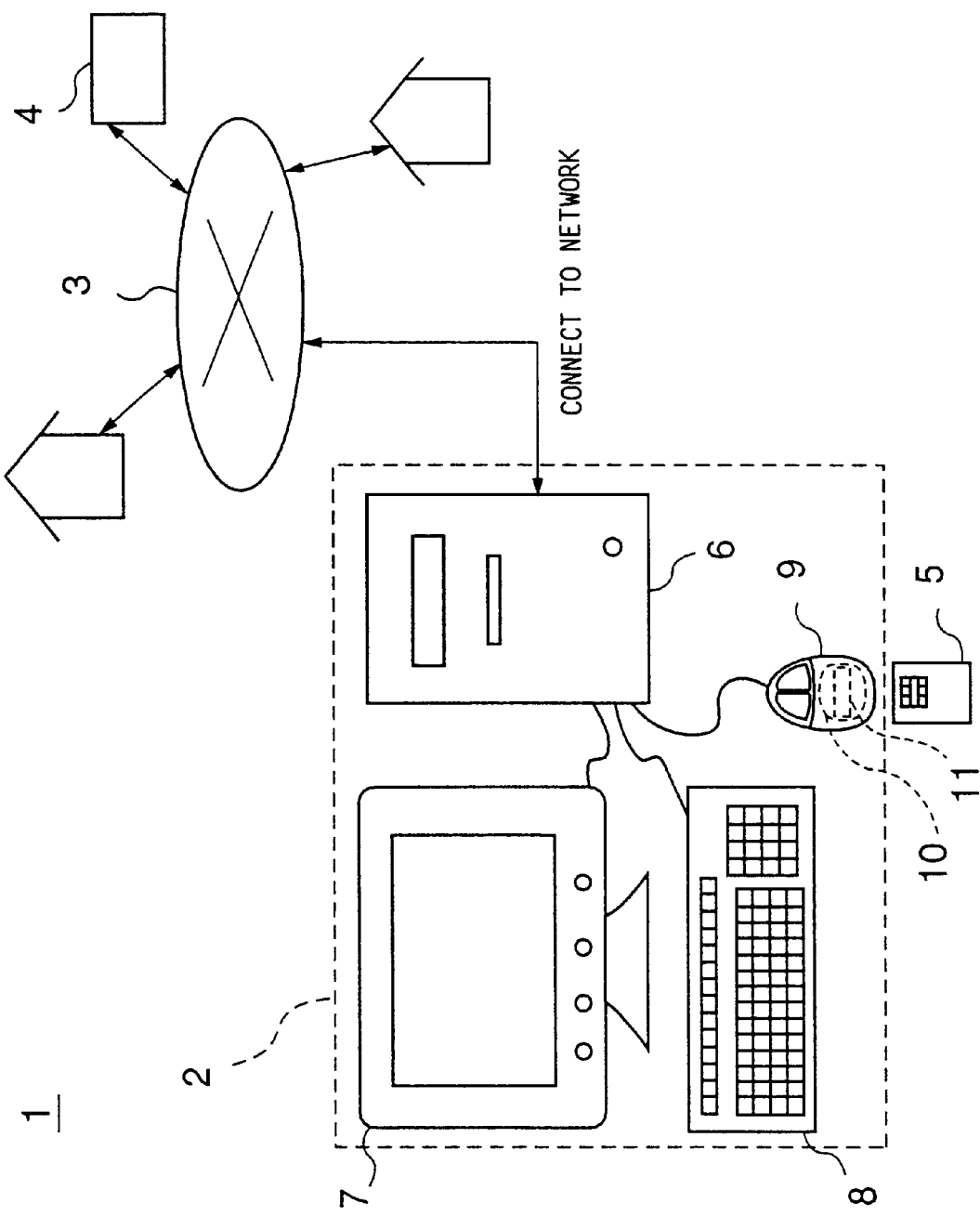

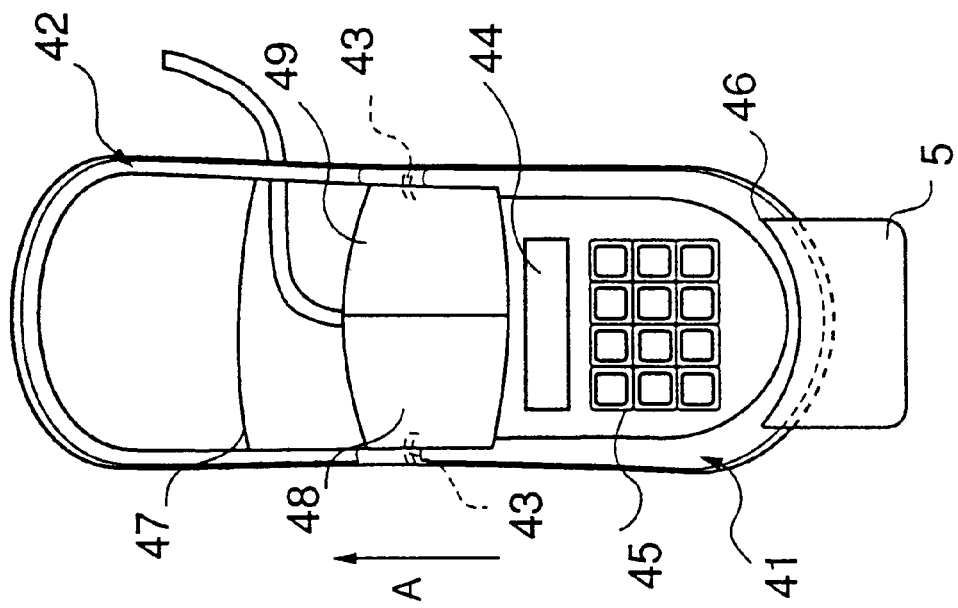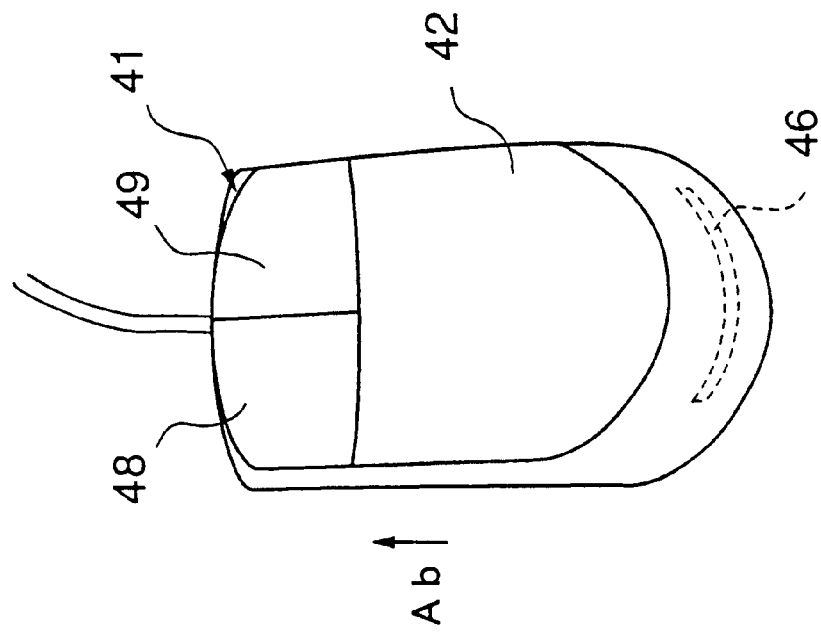

COORDINATE INPUT DEVICE

BACKGROUND THE INVENTION

1. Field of the Invention

The present invention relates to a coordinate input device, a pad used with the coordinate input device and a communication method for the coordinate input device, and particularly relates to a coordinate input device for inputting coordinates pointed to by a pointer displayed on a screen of a personal computer, a pad used with such coordinate input device and a communication method for such coordinate input device.

2. Description of the Related Art

Recently, electronic money is coming into practical use. Accordingly, experiments involving various types of electronic money are being carried out worldwide. Amongst the various types of electronic money, IC card-type electronic money is one of the types of electronic money which is expected to become of greater use in the near future. The IC card-type electronic money is formed of an IC card having various information stored therein and money is deposited and withdrawn based on the information stored in the IC card.

Further, a number of personal computers and data communications using the personal computers is rapidly increasing. Accordingly, when using the IC card-type electronic money, there is plan to connect home personal computers to a bank host computer for depositing and withdrawing money.

However, in order to access the IC card via personal computers, a dedicated IC card reader/writer is required.

FIG. 1 shows a schematic diagram of an IC card-type electronic money system of the related art. In an IC card-type electronic money system 100, a bank host computer 102 is connected, via a network 101, to an ATM 104 accessible to an IC card 103, to an IC card dedicated terminal 105 and to a personal computer (PC) system 107 having an IC card reader/writer 106 connected thereto. Thus, it is possible to deposit and withdraw money using the IC card-type electronic money system 100.

In the above system 100, in order to access the IC card 103 from the PC system 107, there is a need for the IC card reader/writer 106 connected to the PC system 107.

FIG. 2 is a block diagram showing an IC card reader/writer of the related art. The IC card reader/writer 106 is connected to a personal computer (PC) main body 111 of the PC system 107. The IC card reader/writer 106 includes an interface 112 for interfacing with buses (ISA, PCI), an MPU 113 executing processes according to commands from the PC main body 111, a card interface 114 for interfacing with the IC card 103 and a card unit 115 for connecting with the IC card 103.

The IC card reader/writer 106 accesses the IC card 103 upon receipt of a command from the PC main body 111 and then reads information on the IC card 103 such as the balance of an account.

FIG. 3 is a diagram showing an operation of the IC card reader/writer of the related art. When the power is supplied to the PC main body 111 or an application is started, the PC main body 111 sends an OPEN command to the IC card reader/writer 106 (step S6-1). When the OPEN command is provided in step S6-1, the IC card reader/writer 106 detects whether the IC card 103 has been inserted, and if so, the IC card reader/writer 106 returns a response indicating OK (step S6-2). If not, the IC card reader/writer 106 returns a response indicating NG (step S6-2).

When the PC main body 111 receives the NG response from the IC card reader/writer 106, a message is indicated on the display 112 shown in FIG.1 instructing the insertion of the IC card 103. When the PC main body 111 receives the OK response from the IC card reader/writer 106, an ACCESS command produced during the step of processing an application is sent to the IC card reader/writer 106 (step S6-3).

When the ACCESS command is received in step S6-3, the IC card reader/writer 106 accesses the IC card 103 and executes a process according to the command supplied from the PC main body 111 (step S6-4). The IC card 103 executes a process according to the access from the IC card reader/writer 106 and returns a response (step S6-5).

When the response from the IC card 103 is received in step S6-5, the IC card reader/writer 106 sends a response to the PC main body 111, which response corresponds to the response from the IC card 103 (step S6-6).

The above-described steps S6-3 to S6-6 are repeated so as to read and rewrite information stored in the IC card 103.

The IC card reader/writer 106 may be attached to the PC system 107 using a built-in file bay of the PC main body 111 or by externally connecting, for example, a special purpose card to an ISA bus slot and to a PCI bus slot.

However, when attached to the PC system 107, the IC card reader/writer 106 occupies input/output ports and bus slots of the PC system 107. Further, by attaching the IC card reader/writer 106 to the built-in file bay, the extensibility of the PC system 107 is reduced.

Also in case where the IC card reader/writer 106 is externally connected to the PC system 107, the input/output ports and the bus slots are occupied as in the above case. In addition, a space is required around the PC system 107 for the IC card reader/writer 106 to be placed.

Further, in the system described above, the IC card 106 is only accessible when the PC system 107 is operating. Thus, if a user wishes to make a balance inquiry when the PC system 107 has been turned off, there is a need to turn the PC system 107 on only for making a balance inquiry. Therefore, there are problems such as bad operational efficiency.

SUMMARY OF THE INVENTION

Accordingly, it is a general object of the present invention to provide a coordinate input device which can easily introduce an IC card into a personal computer system, a pad used with such a coordinate input device and a communication method for such a coordinate input device.

It is another and more specific object of the present invention to provide a coordinate input device which can input coordinates pointed to by a pointer displayed on a screen of a personal computer, a pad used with such a coordinate input device and a commuication method for such a coordinate input device.

In order to achieve the above objects, a coordinate input device includes coordinate detecting elements for detecting input coordinates, information inputting elements, a communication element for transmitting data of the input coordinates detected by the coordinate detecting elements and information generated by the information inputting elements to a processing device and an IC card access element for allowing an access to an IC card.

In the device described above, an IC card is accessible via a coordinate input device such as a mouse. Therefore, when using a personal computer, it is possible to check and modify the content of the IC card without providing a dedicated IC card reader/writer.

It is still another object of the present invention to provide a coordinate input device which can achieve improved security characteristics.

In order to achieve the above object, the coordinate input device further includes a display element for displaying information thereon.

In the device described above, a display element is provided, so as to make it possible to check the content of the IC card without sending the content of the IC card to the personal computer.

Also, in order to achieve the above object, the IC card access element controls an access to the IC card according to information input by the information inputting elements.

In the device described above, an input key element is provided, so as to make it possible to modify the content of the IC card without sending the content of the IC card to the personal computer.

Also, in order to achieve the above object, the IC card access element compares data input by the information inputting elements and data read from the IC card, so as to allow an access to the IC card when the input data and the read data match.

In the device described above, an ID is pre-stored in the IC card and, when accessing the IC card, an ID is input from the input key element. An access to the IC card is allowed when the pre-stored ID and a input ID match. Thereby, the content of the IC card is prevented from being made an inquiry or modified by an unauthorized person.

It is yet another object of the present invention to provide a coordinate input device which can check and modify the content of the IC card independent of the on/off state of the personal computer.

In order to achieve the above object, the coordinate input device further includes a battery, which allows the IC access element to access the IC card independent of an operation of the processing device.

In the device described above, the battery is provided for driving the IC card access element even when the coordinate input device does not have power supplied thereto by the personal computer.

It is yet another object of the present invention to provide a coordinate input device in which the IC card access element can be positively operated independent of the processing device.

In order to achieve the above object, the coordinate input device further includes a charging element for charging the battery by a power supply provided from the processing device to the coordinate input device via the communication element.

In the device described above, an accumulator is charged by a power supply provided by the processing device for driving the coordinate input device, so that the accumulator may always be charged to a sufficient voltage for driving the IC card access element.

It is yet another object of the present invention to provide a coordinate input device which can achieve an advanced processing of the IC card.

In order to achieve the above object, the coordinate input device further includes a transmission control element for connecting the IC card access element to the processing device via the communication element.

In the device described above, the IC card and the processing device of, for example, a personal computer may be connected. This makes it possible for the content of the IC card to be processed by a personal computer, so that an on-line processing may be executed via, for example, the personal computer.

It is yet another object of the present invention to provide a coordinate input device in which the coordinate input device and the IC card can be simultaneously accessed.

In order to achieve the above object, the transmission control element controls communication between the coordinate input device and the processing device and communication between the IC card access element and the processing device in a time-division manner.

In the device described above, a communication between the coordinate input device and the processing device and a communication between the IC card access element and the processing device are performed in a time division manner.

It is yet another object of the present invention to provide a coordinate input device which can prevent a wrong operation of the input key element.

In order to achieve the above object, when the information inputting elements includes operation elements and an input key element, the coordinate input device further includes a cover, which is freely pivotable between an open position and a closed position, provided so as to cover the input key element in the closed position and such that the input key element is operable both in the open position and in the closed position.

In the device described above, the input key element is covered by a cover. Thereby, the input key element may not be operated while inputting the coordinates.

It is yet another object of the present invention to provide a coordinate input device which can achieve an access to a contact type IC card.

In order to achieve the above object, the IC card access element includes a first coupling element for allowing an access to the IC card by coming into contact with a contact part of the IC card.

In the device described above, an access is allowed in a state that the contact part of the IC card and the first coupling element of the IC card access element are in contact.

It is yet another object of the present invention to provide a coordinate input device which can achieve an access to a non-contact type IC card.

In order to achieve the above object, the IC card access element includes a second coupling element for allowing an access to the IC card by being coupled. to an input/output element of the IC card in a non-contact manner.

In the device described above, an access is allowed in a state that the input/output element of the IC card and the second coupling element of the IC card access element are not in contact.

It is yet another object of the present invention to provide a coordinate input device which can achieve a positive access to the IC card.

In order to achieve the above object, the coordinate input device further includes a holding element for holding the IC card so as to be adjacent to and opposing the first coupling element.

In the device described above, the IC card is held by a holding element, so that the input/output element of the IC card and the first coupling element of the IC card access element are positively coupled.

It is yet another object of the present invention to provide a pad which can achieve a positive access to the IC card.

In order to achieve the above object, a pad used with a coordinate input device having an IC card access element provided with a coupling element for allowing an access to an IC card by being coupled to an input/output element of the IC card in a non-contact manner, includes the holding element for holding the IC card and a main body of the coordinate input device such that the input/output element of the IC card and the second coupling element of the IC card access element are adjacent to and opposing each other.

In the pad described above, the main body of the coordinate input device is held at the holding part, so that the contact part or the input/output element of the IC card and the first or second coupling element of the IC card access element may be positively coupled.

It is yet another object of the present invention to provide a communication method which can access the coordinate detecting elements and the IC card, simultaneously.

In order to achieve the above object, the communication method includes a step of alternately sending a first communication permission command and a second communication permission command, in a time division manner, from the processing device to the coordinate input device, the first communication permission command being for permitting a communication with the coordinate detecting elements and the second communication permission command being for permitting a communication with the IC card access element, a step of sending data of the input coordinates detected by the coordinate detecting elements to the processing device, when the first communication permission command is supplied to the coordinate input device from the processing device, and a step of allowing the processing device to access the IC card via the IC card access element, when the second communication permission command is supplied to the coordinate input device from the processing device.

In the method described above, first communication permission commands for permitting a communication with the coordinate detecting elements and second communication permission commands for permitting a communication with the IC card access element are alternately sent in a time division manner, from the processing device to the coordinate input device.

It is yet another object of the present invention to provide a communication method which can achieve a faster response without delaying an access to the IC card.

In order to achieve the above object, the communication method further includes a step of sending the first communication permission command from the processing device to the coordinate input device, in response to the second communication permission command, via the IC card access element during an access process between the processing device and the IC card, and a step of sending the data of the input coordinates detected by the coordinate detection elements from the coordinate input device to the processing device.

In the method described above, a more detailed detection of the coordinates can be performed by performing the detection during an access to the IC card, since in general, an access to the IC card takes up more time compared to the detection of the coordinates.

Other objects and further features of the present invention will be apparent from the following detailed description when read in conjunction with the accompanying drawings.

BRIEF DESCRIPTION OF THE DRAWINGS

FIG. 3 is an operational diagram of the IC card reader/writer of the related art.

FIG. 4 is a schematic diagram showing an embodiment of the present invention.

FIGS. 13A and 13B are schematic diagrams showing a first variant of the mouse according to an embodiment of the present invention.

DETAILED DESCRIPTION OF THE PREFERRED EMBODIMENTS

Figure 1:
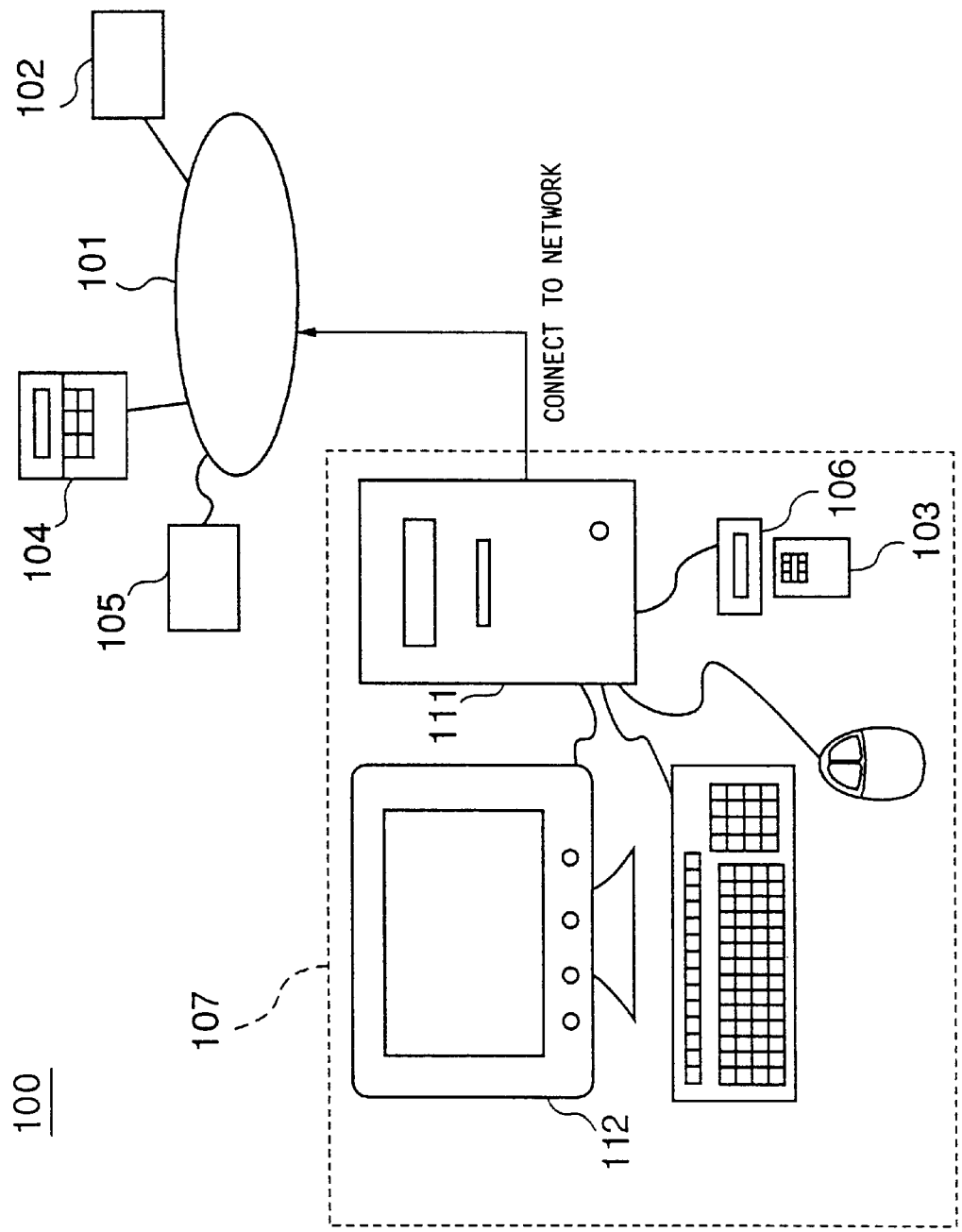
FIG. 1 is a schematic diagram showing an IC card-type electronic money system of the related art.

In the following, a principle and embodiments of the present invention will be described with reference to the accompanying drawings.

FIG. 4 is a schematic diagram showing an embodiment of the present invention. In the present embodiment, a coordinate input device of the present invention is used in an electronic money system.

In a system 1 of the present embodiment, a personal computer (PC) 2 is connected to a host computer 4 of, for example, a financial institution via a communication line 3 such as a telephone line, so that money can be deposited via the PC 2 to an IC card 5. The PC 2 includes a PC main body 6 connected with a display 7, a keyboard 8 and a mouse 9.

The mouse 9 represents the coordinate input device as claimed in this application. The mouse 9 has an IC card access part 10, which is integrated thereto, for making an access to the IC card 5.

At the IC card access part 10, the IC card 5 is inserted into an IC card insert part 11. The IC card access part 10 accesses the IC card 5 inserted in the IC card insert part 11 and then reads/writes information stored in the IC card 5.

Figure 5A:
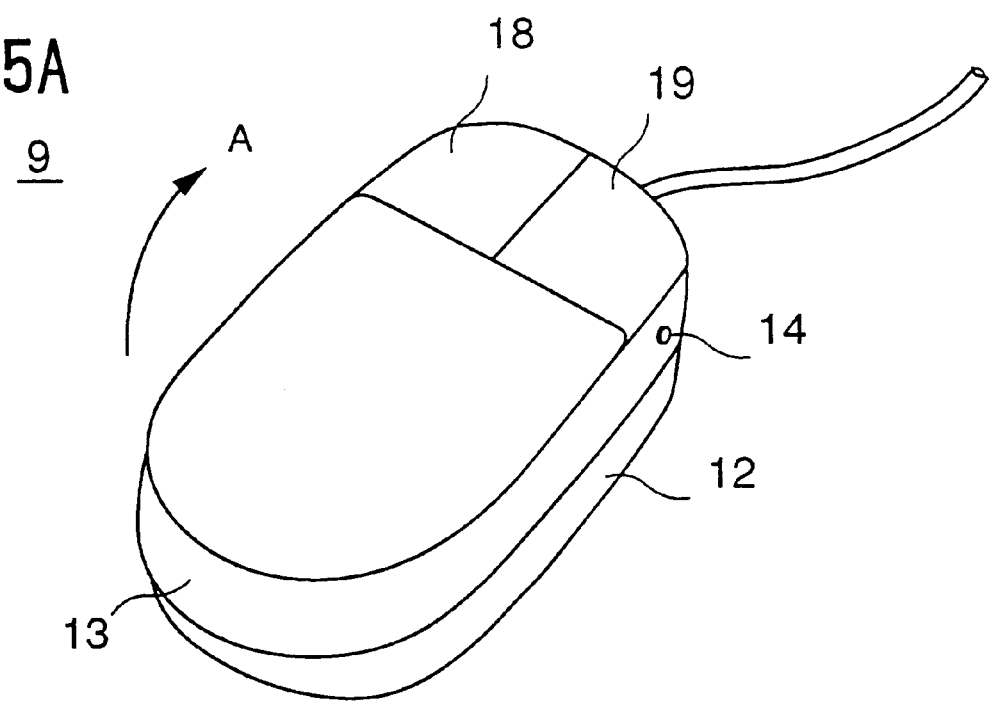
FIGS. 5A and 5B are perspective diagrams showing a mouse according to the embodiment of the present invention.
Figure 5B:
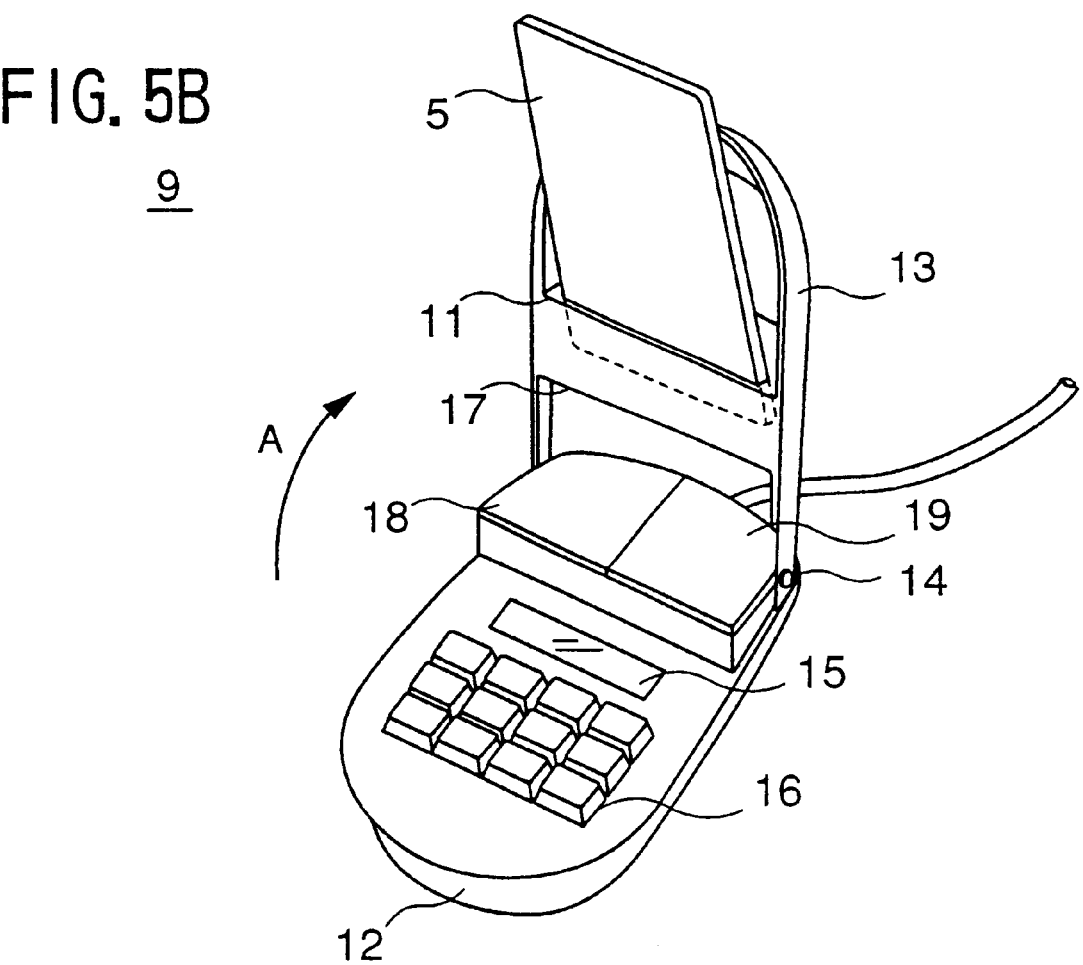

FIGS. 5A and 5B are perspective diagrams of a mouse according to the embodiment of the present invention. FIG. 5A shows a state where a cover is closed, and FIG. 5B shows a state where the IC card 5 is inserted.

The mouse 9 includes a mouse main body 12 and a cover 13. The cover 13 is provided on the mouse main body 12 so as to be rotatable about a pivot 14.

The cover 13 is opened by pivoting the cover 13 about the pivot 14 in a direction A. When the cover 13 is opened, a display part 15 and an input key part 16 on the mouse body part 12 are exposed. Also, the IC card insert part 11 for inserting the IC card 5 on the backside of the cover 13 is exposed.

The cover 13 has a cut-away part 17 formed near the pivot 14. A left operating button 18 and a right operating button 19 of the mouse 9 fit in the cut-away part 17 so that the left/right operating buttons 18,19 are always exposed whether the cover 13 is open or closed. Since the left/right operating buttons 18,19 are always exposed on the mouse main body 12, and are always operable, a normal mouse operation is possible both when the cover 13 is open or closed.

Figure 6:
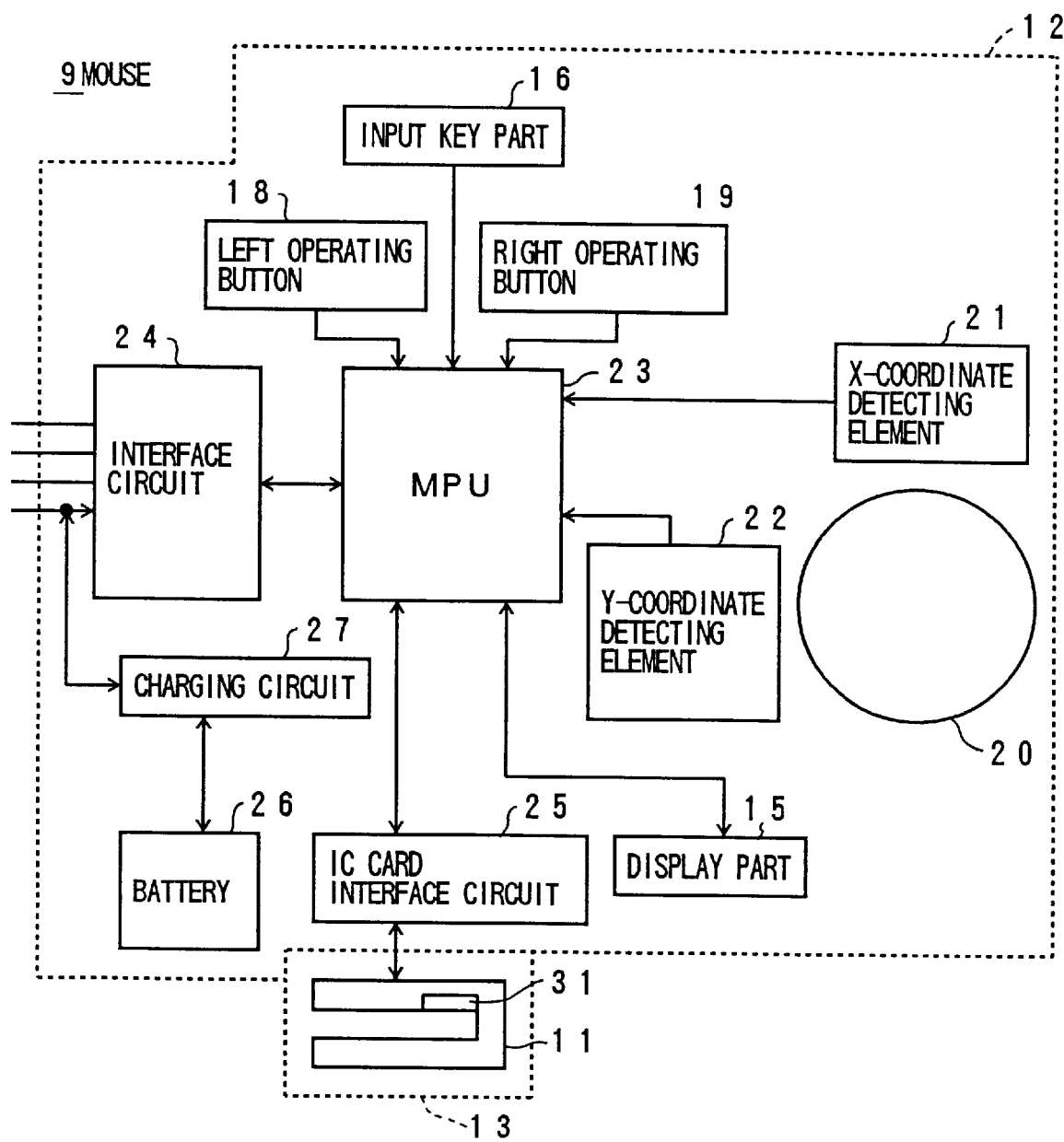
FIG. 6 is a block diagram showing the mouse according to the embodiment of the present invention.

FIG. 6 is a block diagram showing the mouse according to the embodiment of the present invention. In the figure, the same elements as those of FIGS. 5A and 5B are indicated by the same reference numbers.

The mouse main body 12 having the display part 15, the input key part 16 and the left/right operating buttons 18, 19 further includes a ball 20 for detecting a displacement, an X-coordinate detecting element 21 for detecting a distance traveled by the ball 20 in an X-axis direction, a Y-coordinate detecting element 22 for detecting a distance traveled by the ball 20 in a Y-axis direction orthogonal to the X-axis, an MPU 23 for executing various processes, an interface circuit 24 interfacing the MPU 23 and the PC main body 6, an IC card interface circuit 25 interfacing the IC card 5 inserted in the IC card insert part 11 and the MPU 23, a battery 26 for supplying driving electric power when the PC main body 6 is turned off, and a charging circuit 27 for charging the battery 26 when the PC main body 6 is turned on.

The IC card 5 is made of a so-called contact type IC card having a contact part on a card surface, so that the IC card is accessible by bringing the contact part in contact with an electrode.

Figure 7A:
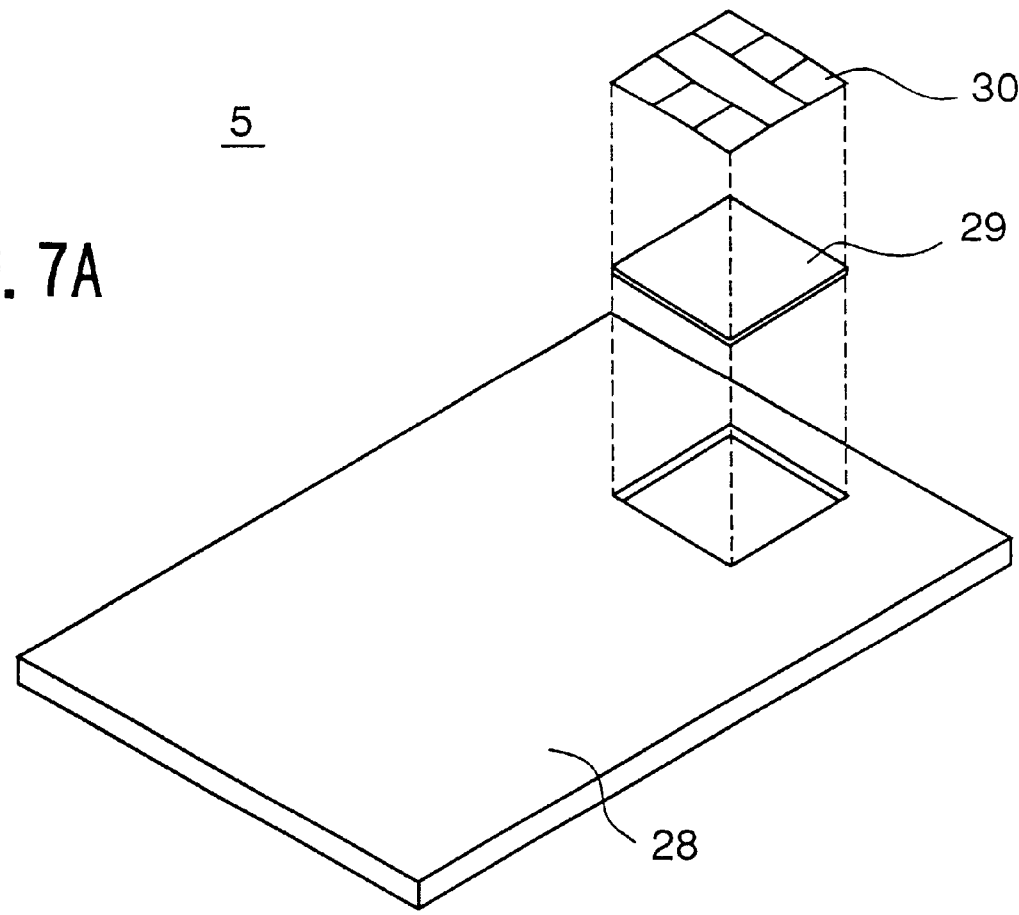
FIGS. 7A and 7B are perspective diagrams showing an IC card according to the embodiment of the present invention.
Figure 7B:
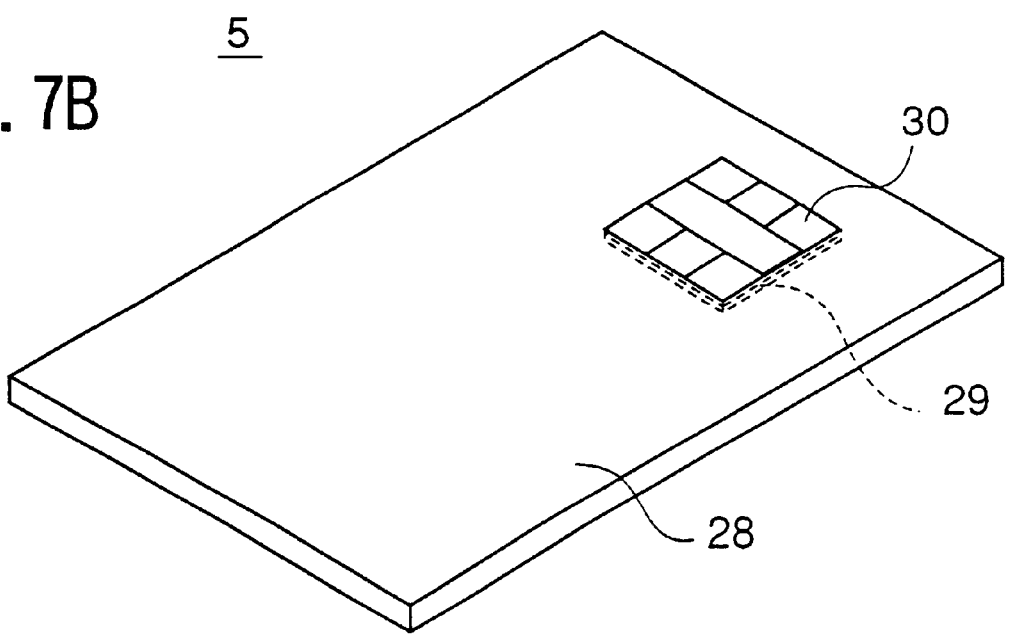

FIGS. 7A and 7B are perspective diagrams showing the IC card 5 according to the embodiment of the present invention. FIG. 7A is an exploded perspective view of the IC card 5 and FIG. 7B is a perspective view of the IC card 5.

As shown in FIG. 7A, the IC card 5 is formed such that an LSI chip 29 is embedded at a predetermined position on a card 28 made of resin and a contact part 30 is provided thereon for connecting the IC card and an external circuit. The LSI chip 29 includes elements such as an interface circuit, a CPU, a RAM, a ROM, and an EEPROM, all of which are formed in an integrated manner. When the IC card 5 is used as electronic money, a code number and information on deposit/withdrawal are stored in the EEPROM in a rewritable manner.

The contact part 30 is formed with a predetermined standard pattern so as to be exposed from the card surface at a predetermined position on the card 28, as shown in FIG. 7B.

The IC card 5 conforms to, for example, ISO 7816.

Referring again to FIG. 6, the present embodiment will be described. By inserting the IC card 5 in the IC card insert part 11, the contact part 30 comes into contact with an electrode 31 provided on the IC card insert part 11 as shown in FIG. 6. Thus, it is possible to access the IC card 5.

The electrode 31 of the IC card insert part 11 is connected to the MPU 23 via the IC card interface circuit 25. The MPU 23 is connected to the display part 15, the input key part 16, the left operating button 18, the right operating button 19, the X-coordinate detecting element 21, the Y-coordinate detecting element 22, the interface circuit 24 and the IC card interface circuit 25.

The X-coordinate detecting element 21 is, for example, formed such that a rotational axis of a rotary encoder is in contact with the ball 20, so that the rotational axis of the rotary encoder will rotate in response to the rotation of the ball in the X-axis direction. The rotary encoder generates pulses according to a movement of the ball 20 in the X-axis direction. A counter counts the pulses according to the movement of the ball 20 in the X-axis direction. The counted value of the pulses according to the distance traveled in the X-axis direction is provided to the MPU 23.

The Y-coordinate detecting element 22 is, for example, formed such that a rotational axis of a rotary encoder is in contact with the ball 20, so that the rotational axis of the rotary encoder will rotate in response to the rotation of the ball in the Y-axis direction. The rotary encoder generates pulses according to a movement of the ball 20 in the Y-axis direction. A counter counts the pulses according to the movement of the ball 20 in the Y-axis direction. The counted value of the pulses according to the distance traveled in the Y-axis direction is provided to the MPU 23.

Also, operation of the left/right operating buttons 18,19 is recognized in the MPU 23 and is provided to the PC main body 6 via the interface circuit 24.

In response to the command from the PC main body 6, the MPU 23 sends coordinate data and the data of the IC card 5. Also, in the state where the PC main body 6 is turned off, the MPU 23 is driven by the battery 26, so as to display the data of the IC card 5 with the operation of the input key part 16 and to enable writing of the data into the IC card 5.

Figure 8:
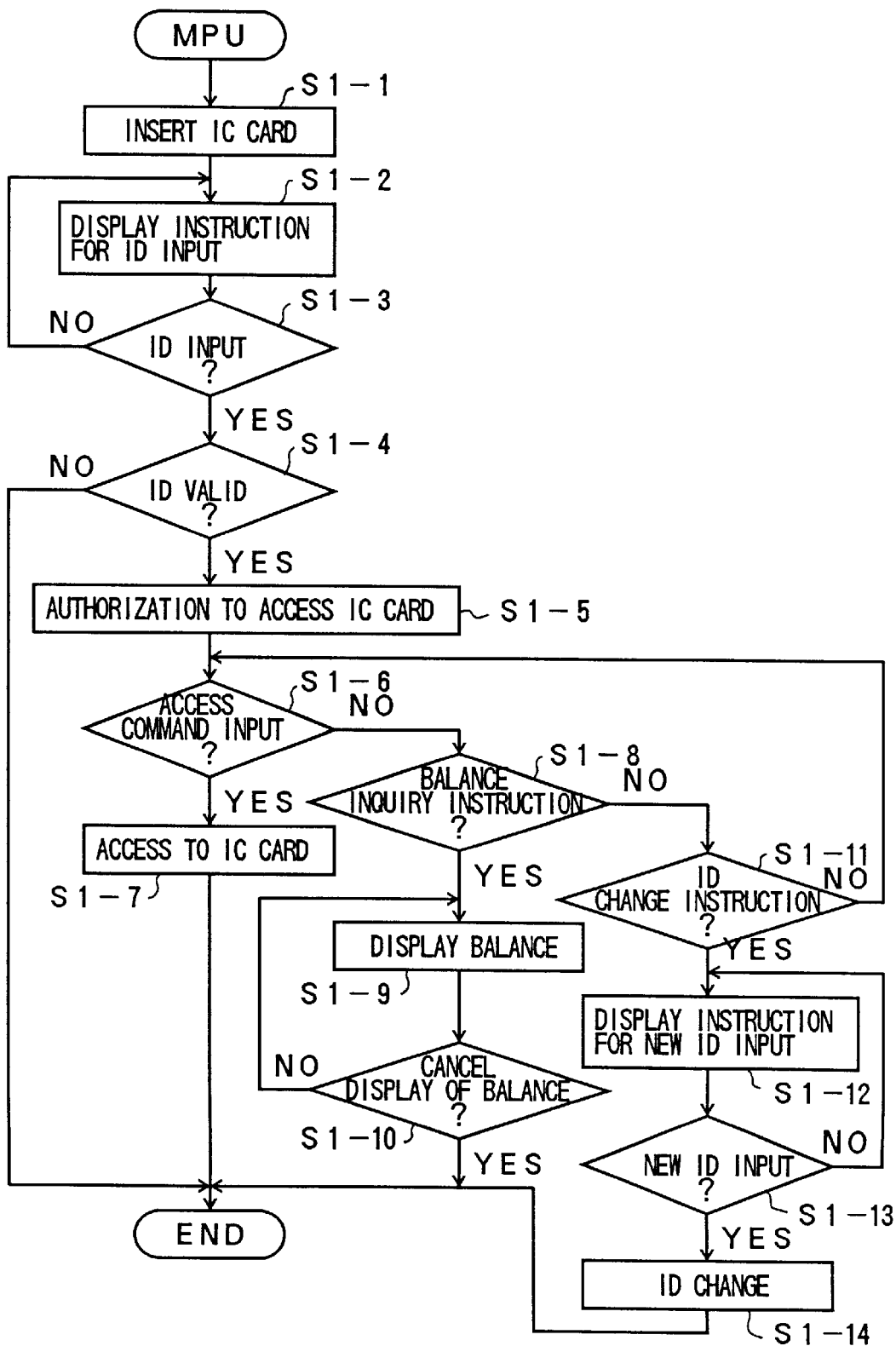
FIG. 8 is a flowchart showing an operation of an MPU of the mouse according to the embodiment of the present invention.

FIG. 8 is a flowchart showing an operation of the MPU 23 according to the embodiment of the present invention.

The cover 13 is opened and the IC card 5 is inserted into the IC card insert part 11 (step S1-1). Then, the MPU 23 displays an instruction to input an ID on the display part 15 (step S1-2).

When the ID is input from the input key part 16 (step S1-3), it is determined whether the ID input from the input key part 16 is valid or invalid (step S1-4).

The ID is checked by comparing a pre-stored ID within the IC card 5 and the ID input from the input key part 16, and detecting whether they match or not. If the pre-stored ID in the IC card 5 and the ID input from the input key part 16 match, the input ID is determined to be valid, and if not invalid.

If, in step S1-4, the ID is determined to be valid, then the access to the IC card 5 is authorized (step S1-5).

After authorization to access the IC card 5, if an ACCESS command to the IC is provided from the PC main body 6 (step S1-6), the information stored in the IC card 5 is processed according to the command from the PC main body 6 (step S1-7).

If there is a balance inquiry instruction from the input key part 16 (step S1-8), balance information is read from the IC card 5 and is displayed on the display part 15 until a balance inquiry display cancellation instruction is given (step S1-9, S1-10).

Further, if there is an ID change instruction from the input key part 16 (step S1-11), an instruction to input a new ID is displayed on the display part 15 (step S1-12). Then, if the new ID is input from the input key part 16 (step S1-13), an ID to be stored in the IC card 5 is replaced by a new ID input from the input key part 16 (step S1-14).

As described above, in the present embodiment, a balance inquiry and a change of ID of the IC card 5 are possible by instructions from the input key part 16. Thus, there is no need for sending/receiving information such as an ID between the IC card 5 and the PC main body 6. This prevents the ID or other information such as the balance from being taken into the PC 2 by operations such as inputting the ID and checking the balance and from leaking out on a later operation of the PC 2. Thereby, an improved security characteristic is achieved.

Also, the balance inquiry and ID change of the card 5 are possible when the mouse 9 is driven by the battery 26. Therefore, the balance inquiry and ID change may be easily performed even when the PC main body 6 is turned off.

In the following, an electronic money transaction by the PC 2 using the mouse 9 will be described.

Figure 9:
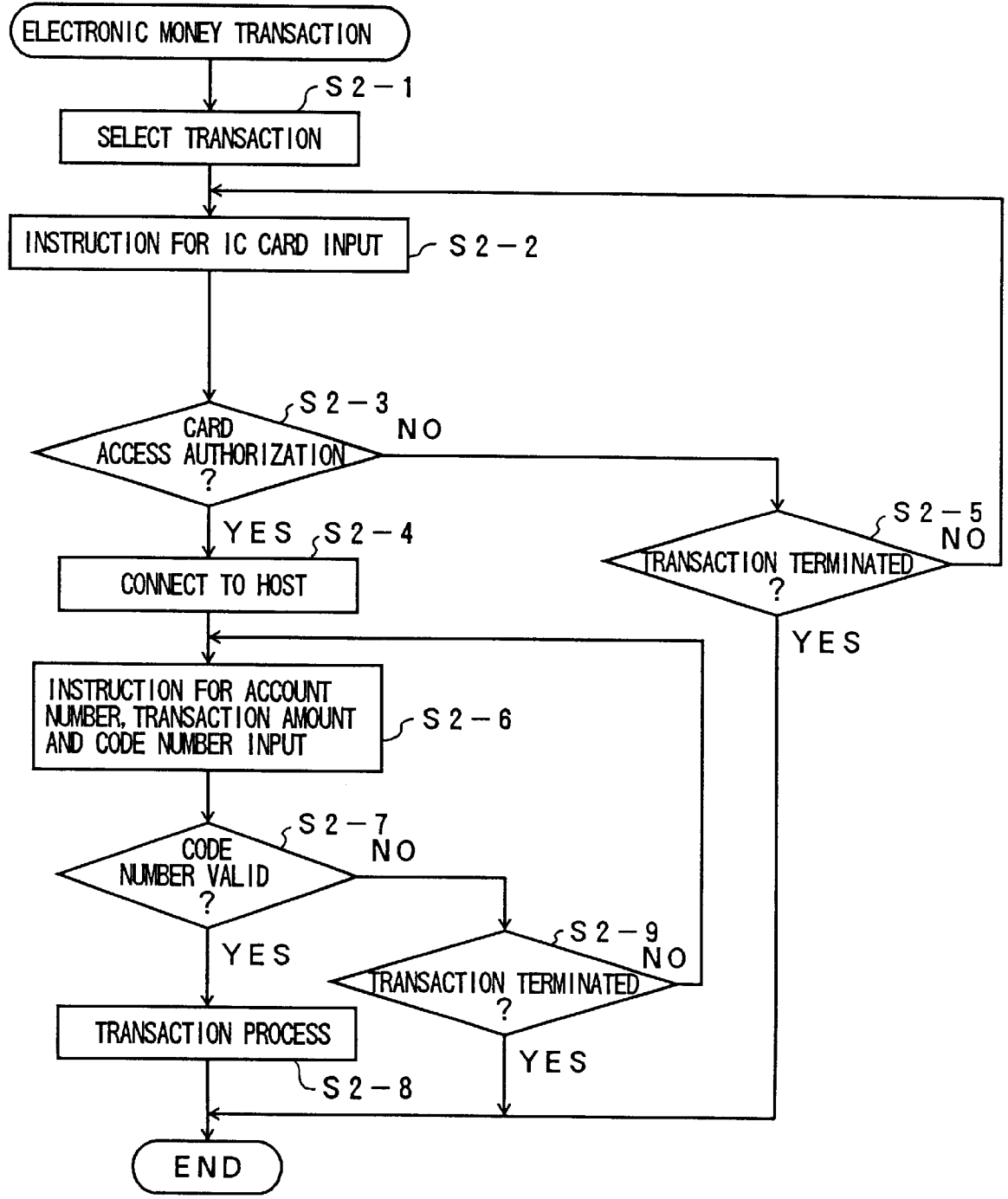
FIG. 9 is a flowchart showing an operation of an electronic money transaction process executed by a personal computer according to the embodiment of the present invention.

FIG. 9 is a flowchart showing an operation of an electronic money transaction process executed by the personal computer according to the embodiment of the present invention.

In the PC 2, when an electronic money transaction application is started and a transaction is selected (step S2-1), an instruction for inputting the IC card 5 is indicated (step S2-2).

When the IC card 5 is inserted, it is determined, in the mouse 9, whether an access to the IC card 5 is permitted or not by steps S1-1 to S1-5 shown in FIG. 8. When an access to the IC card 5 is authorized is the mouse 9 (step S2-3), a communication software is started and the PC 2 is connected to the host computer 4 via the telephone line 3 (step S2-4). Also, when an access from the PC 2 to the IC card 5 is not authorized in the mouse 9 in step S2-3, an instruction for inserting the IC card 5 is displayed until the transaction is terminated (step S2-5). Connection to the host computer 4 may be established at the start of the electronic money transaction process.

Then, the PC 2 displays an instruction for inputting an account number, an amount of transaction and a code number of the account and sends the input account number, amount of transaction and code number of the account to the host computer 4 (step S2-6). The host computer 4 determines whether the input code number of the account is valid or invalid and sends the result to the PC 2.

In the PC 2, if the result of the determination of the code number of the account in the host computer 4 is valid (step S2-7), then a transaction is made by modifying the balance of the IC card 5 (step S2-8). Also in step S2-7, if the result of the determination of the code number of the account in the host computer 4 is invalid, then an instruction for inputting the code number will be indicated until the transaction is terminated (step S2-9).

Also, from the PC main body 6 to the mouse 9, an access for obtaining an amount of displacement of the mouse 2 and an access to the IC card 5 are alternately carried out. Thus, it is possible to move a cursor using the mouse 9 while an access is being made to the IC card 5.

Figure 10:
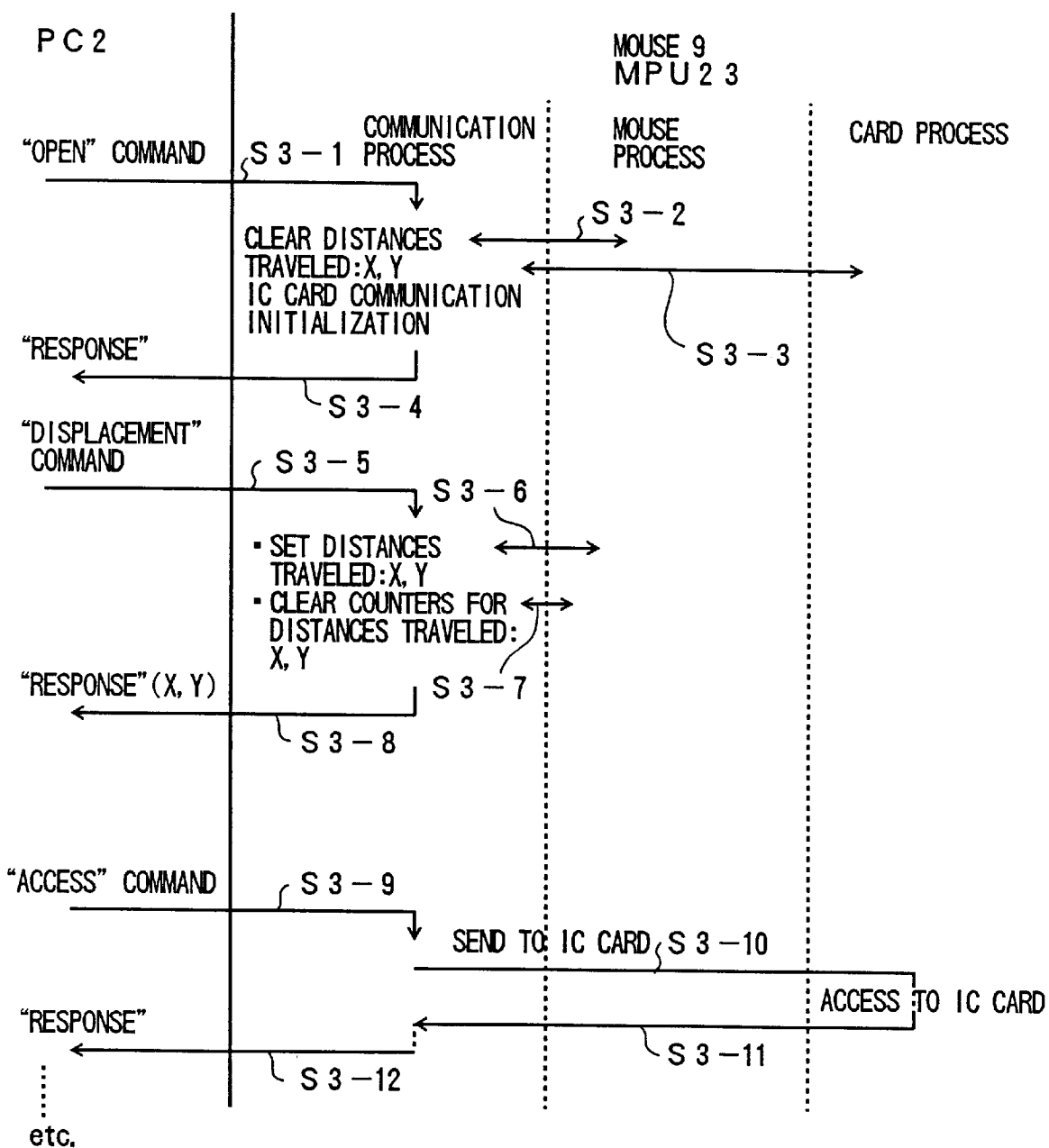
FIG. 10 is an operational diagram of a communication between the personal computer and the mouse according to the embodiment of the present invention.

FIG. 10 is a diagram showing an operational diagram of a communication between the personal computer and the mouse according to the embodiment of the present invention.

The PC main body 6 supplies an OPEN command for connecting the mouse 9 and the PC main body 6 when the power supply is turned on (step S3-1). If in step S3-1, the OPEN command is provided from the PC main body 6, the mouse 9 clears counters for accumulating the distances traveled X, Y obtained from the X-coordinate detecting element 21 and the Y-coordinate detecting element 22 (step S3-2). Also, the mouse 9 initializes the process for making an access to the IC card 5 (step S3-3).

Further, after the initialization in steps S3-2 and S3-3, the mouse 9 returns a response to the PC main body 6 announcing that preparation is completed (step S3-4).

When the response to the OPEN command from the mouse 9 is received in step S3-4, the PC main body 6 sends a DISPLACEMENT command for detecting the distance of a pointer and the ACCESS command alternately.

When the DISPLACEMENT command is input from the PC main body 6 to the mouse 9 (step S3-5), the MPU 23 detects the distances traveled X, Y and sets those amounts as send information (step S3-6). After setting the distances traveled X, Y as the send information, the counters for accumulating the distances traveled X, Y obtained from the X-coordinate detecting element 21 and the Y-coordinate detecting element 22 are cleared (step S3-7).

If the counters for accumulating the distances traveled X, Y obtained from the X-coordinate detecting element 21 and the Y-coordinate detecting element 22 are cleared in step S3-7, the distances traveled X, Y set in step S3-6 is sent to the PC main body 6 (step S3-8). Also, if the counters for accumulating the distances traveled X, Y obtained from the X-coordinate detecting element 21 and the Y-coordinate detecting element 22 are cleared in step S3-7, the counters are set to the distances traveled. X, Y by executing a normal mouse process so as to detect the distances traveled X, Y.

In the following, the normal mouse process in the MPU will be described.

Figure 11:
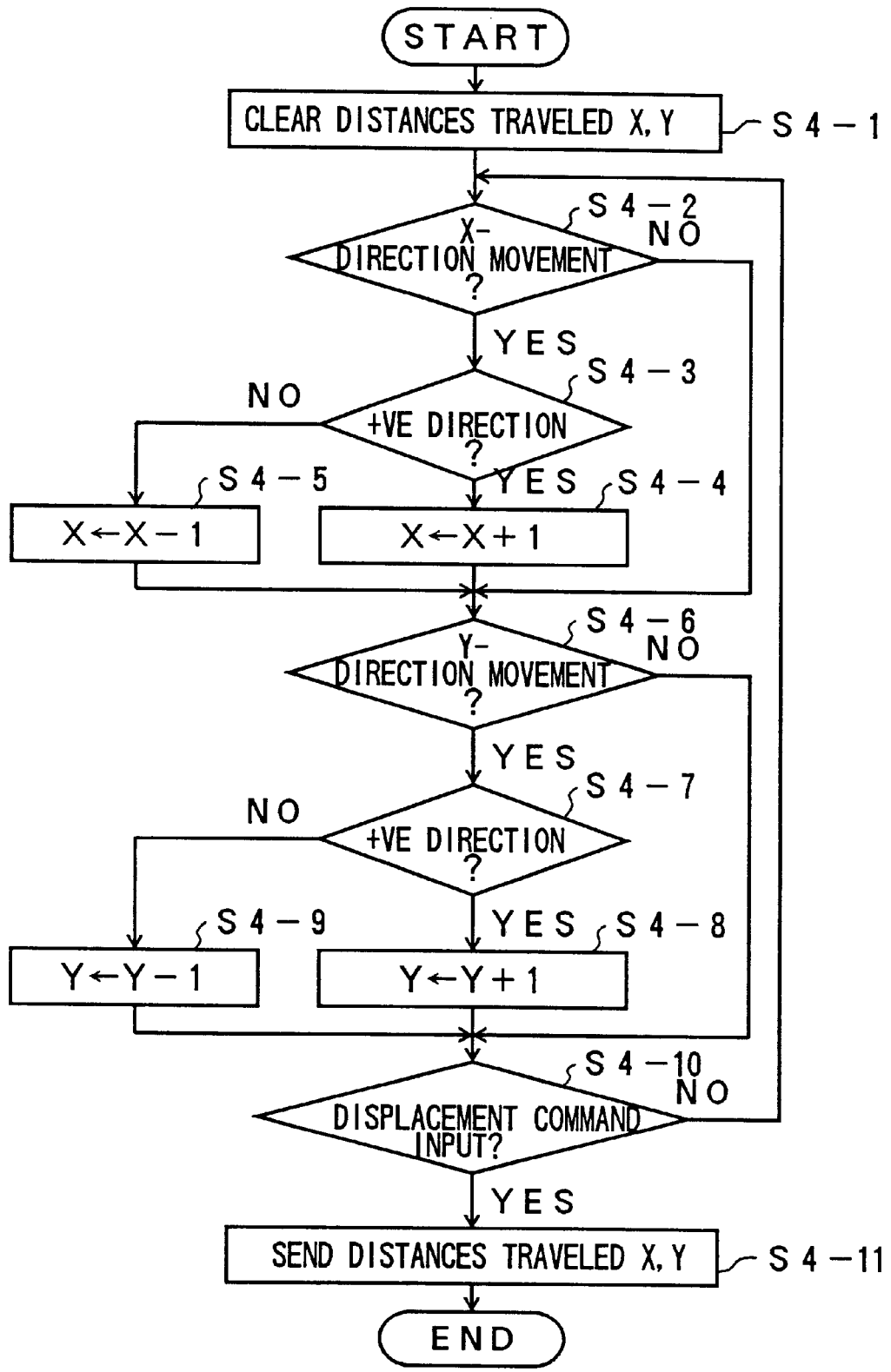
FIG. 11 is a flowchart showing a mouse process executed by the MPU of the mouse according to the embodiment of the present invention.

FIG. 11 is a flowchart showing a mouse process executed by the MPU of the mouse according to the embodiment of the present invention.

In the mouse process, if the distances traveled X, Y are cleared (step S4-1), the X-direction distance is detected (step S4-2). If, in step S4-2, the X-direction distance is in a positive direction (step S4-3), then the distance X is incremented by 1 (step S4-4). If the X-direction distance is in a negative direction, the distance X is decremented by 1 (step S4-5).

After calculation of the distance X in steps S4-2 to S4-5, the Y-direction distance is detected (step S4-6). If, in step S4-6, the Y-direction distance is in a positive direction (step S4-7), then the distance Y is incremented by 1 (step S4-8). If the Y-direction distance is in a negative direction, the distance Y is decremented by 1 (step S4-9).

Then, steps S4-2 to S4-9 are repeated until a DISPLACEMENT command is input from the PC main body 6. When the DISPLACEMENT command is input from the PC main body 6 (step S4-10), the distances traveled X, Y obtained by repeating steps S4-2 to S4-9 are sent to the PC main body 6 (step S4-11).

As shown in FIG. 10, the PC main body 6 receives the distances traveled X, Y from the mouse 9 in step S3-8, and then sends an ACCESS command to the mouse 9 for accessing the IC card 5 (step S3-9). After receiving the ACCESS command from the PC main body 6 in step S3-9, the mouse 9 accesses the IC card 5 (step S3-10).

The IC card 5 reads/writes information according to the ACCESS command from the PC2 (step S3-11). The mouse 9 sends the result of the access to the IC card 5 to the PC main body 6 (step S3-12).

In the present embodiment, steps S3-5 to S3-12 are repeated, so that the mouse 9 can move the pointer and can access the IC card 5, simultaneously. Therefore, when making a transaction with electronic money, it is possible to read/write information in the IC card 5 while moving the pointer by the mouse 9 and executing the processes.

In the present embodiment, DISPLACEMENT commands for obtaining distances traveled X, Y of the mouse 2 and ACCESS commands for allowing an access to the IC card 5 are alternately sent from the PC main body 6 to the mouse 9. However, an access to the IC card 5 is more time-consuming compared to the detection of the distances traveled X, Y. Therefore, a DISPLACEMENT command may be supplied from the PC main body 6 to the mouse 9 upon access to the IC card 5, so as to obtain the distances traveled X, Y before a response is returned from the IC card 5.

Figure 12:
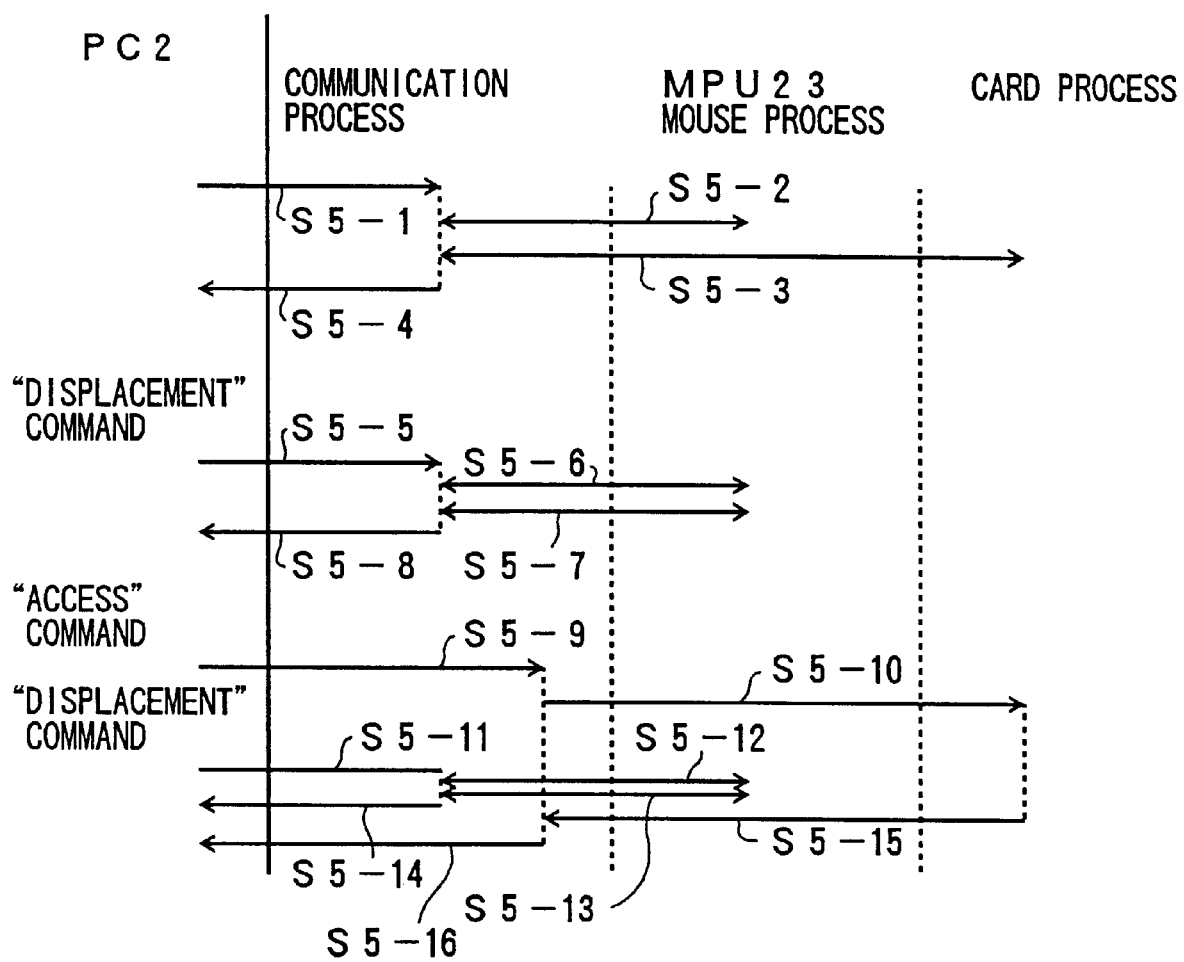
FIG. 12 is an operational diagram of a variant of the communication between the personal computer and the mouse according to the embodiment of the present invention.

FIG. 12 is a diagram showing an operational diagram of a variant of the communication between the personal computer and the mouse according to the embodiment of the present invention.

The PC main body 6 supplies an OPEN command for connecting the mouse 9 and the PC main body 6 when the power supply is turned on (step S5-1). If the OPEN command is supplied from the PC main body 6 in step S5-1, the mouse 9 clears the counters for accumulating the distances traveled X, Y obtained from the X-coordinate detecting element 21 and from the Y-coordinate detecting element 22 (step S5-2). The mouse 9 also initializes a process for accessing the IC card 5 (step S5-3).

Further, after initialization in steps S5-2 and S5-3, the mouse 9 returns a response to the PC main body 6 announcing that preparation is completed (step S5-4).

When the response to the OPEN command from the mouse 9 is received in step S5-4, the PC main body 6 sends a DISPLACEMENT command for detecting the distance of a pointer (step S5-5).

When the DISPLACEMENT command is input from the PC main body 6 to the mouse 9 in step S5-5, the MPU 23 detects the distances traveled X, Y and sets those distances as send information (step S5-6). After setting the distances traveled X, Y as the send information, the counters for accumulating the distances traveled X, Y obtained from the X-coordinate detecting element 21 and the Y-coordinate detecting element 22 are cleared (step S5-7).

Figure 2:
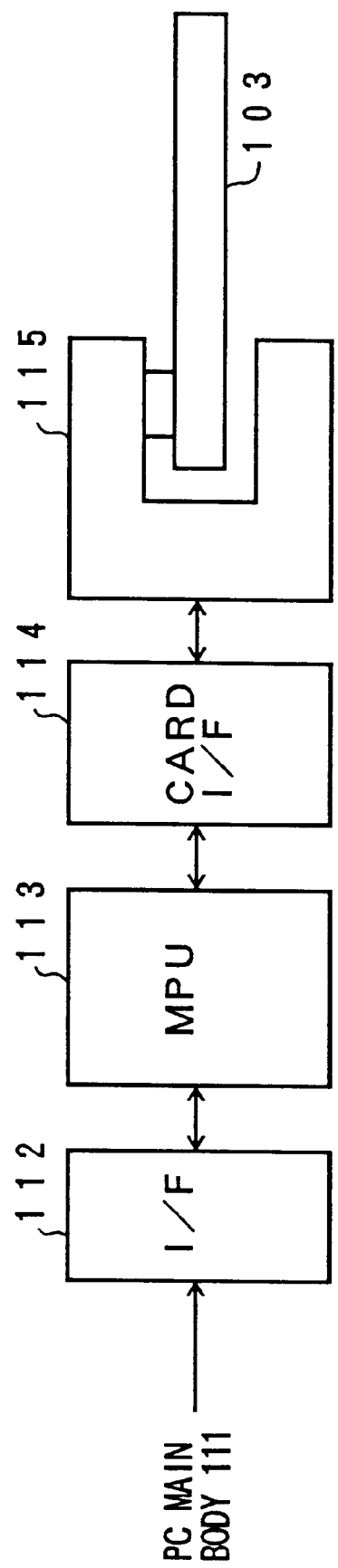
FIG. 2 is a block diagram showing an IC card reader/writer of the related art.

If the counters for accumulating the distances traveled X, Y obtained from the X-coordinate detecting element 21 and the Y-coordinate detecting element 22 are cleared in step S5-7, the distances traveled X, Y set in step S5-6 is sent to the PC main body 6 (step S5-8). Also, when the counters for accumulating the distances traveled X, Y obtained from the X-coordinate detecting element 21 and the Y-coordinate detecting element 22 are cleared in step S5-7, the counters are set to the distances traveled X, Y by executing a process similar the process carried out by a mouse of the related art shown in FIG. 2, so as to detect the distances traveled X, Y.

When the distances traveled X, Y are received in step S5-8, the PC main body 6 send an ACCESS command to the mouse 9 for accessing the IC card 5 (step S5-9). When the ACCESS command is received from the PC main body 6 in step S5-9, the mouse reads/writes information according to the ACCESS command from the PC main body 6 (step S5-10).

While accessing the IC card 5 according to the ACCESS command, the PC main body 6 sends a DISPLACEMENT command to the mouse 9 (step S5-11). When the DISPLACEMENT command is input from the PC main body 6 to the mouse 9 in step S5-11, the MPU 23 detects the distances traveled X, Y and sets those amounts as send information (step S5-12). After setting the distances traveled X, Y as the send information, the counters for accumulating the distances traveled from the X-coordinate detecting element 21 and the Y-coordinate detecting element 22 are cleared (step S5-13).

After clearing the counters for accumulating the distances traveled X, Y obtained from the X-coordinate detecting element 21 and the Y-coordinate detecting element 22 in step S5-13, the distances traveled X, Y set in step S5-12 are sent to the PC main body 6 (step S5-14). Also, when the counters for accumulating the distances traveled X, Y obtained from the X-coordinate detecting element 21 and the Y-coordinate detecting element 22 are cleared in step S5-13, the counters are set to the distances traveled X, Y by executing a process similar to the mouse process shown in FIG. 11, so as to detect the distances traveled X, Y.

Then the result of an access to the IC card 5 at S5-10 is obtained (step S5-15), and the result of access of the IC card 5 is sent to the PC main body 6 (step S5-16).

In the present embodiment, steps S5-5 to S5-16 are repeated so that the mouse 9 can move the pointer and can access the IC card 5, simultaneously. In the present embodiment, the information of distances traveled X, Y is obtained by generating a DISPLACEMENT command while accessing the IC card 5 according to the ACCESS command provided by the PC main body 6 to the mouse 9. Thus, the distances traveled X, Y detected at the mouse 9 may be obtained frequently, so that the pointer can be smoothly transferred on the display 7 of the PC 2.

Further, in the present embodiment, the IC card insert part 11 is provided on the cover 13, but the IC card insert part 11 may be provided on the mouse main body 12.

FIGS. 13A and 13B are schematic diagrams showing a first variant of the mouse according to an embodiment of the present invention. FIG. 13A shows a state where the cover is closed and FIG. 13B shows a state where the IC card 5 is inserted.

The mouse 40 of the present variant includes a mouse main body 41 and a cover 42. The cover 42 is provided on the mouse main body 41 so as to be rotatable about a pivot 43.

The cover 42 is opened by pivoting the cover 42 about the pivot 43 in a direction A. When the cover 42 is opened, a display part 44 and an input key part 45 on the mouse main body 41 are exposed. An IC card insert part 46 is provided on the mouse main body 41.

The cover 42 has a cut-away part 47 formed near the pivot 43. A left operating button 48 and a right operating button 49, which are operating buttons of the mouse 40, fit in the cut-away part 47, so that the left/right operating buttons 48,49 are exposed whether the cover 42 is open or closed. Since the left/right operating buttons 48,49 are always exposed on the mouse main body 41, and are always operable, normal mouse operation will be possible both when the cover 42 is open or closed.

Thus, by providing the IC card insert part 46 on the mouse main body 41, the structure of the cover 42 may be simplified. Also, there is no need for providing a connection between the cover 42 and the mouse main body 41.

Although the IC card 5 of a contact type is used in the present embodiment, information may be read from a non-contact type IC card.

Figure 14A:
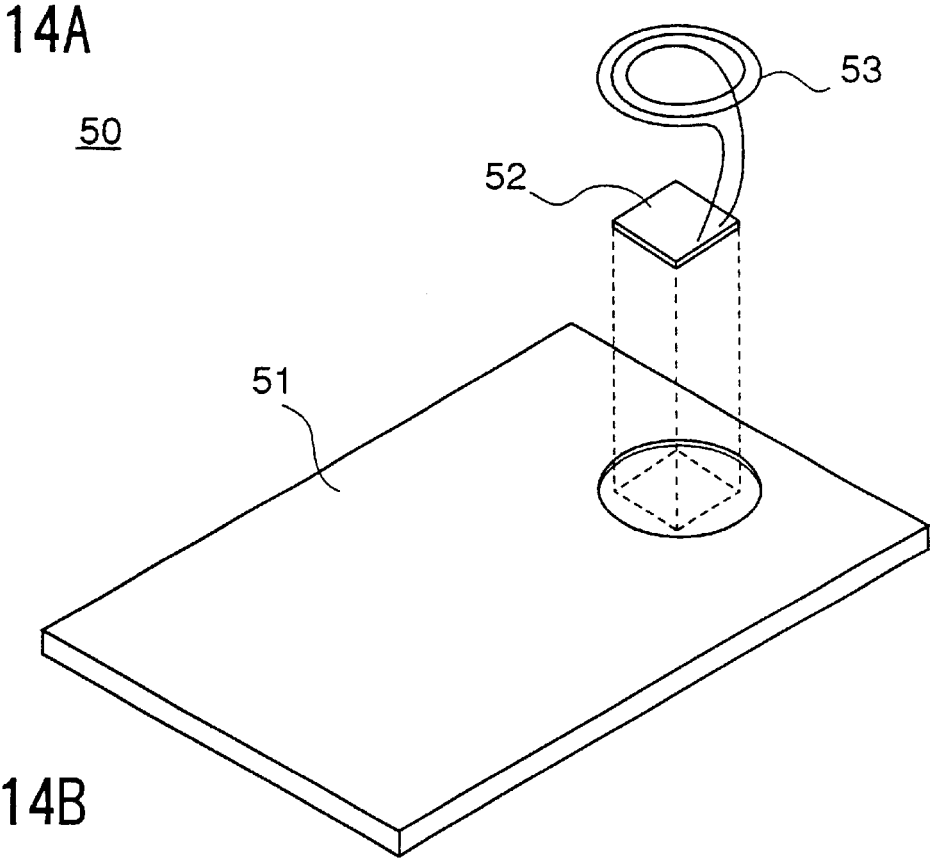
FIGS. 14A and 14B are perspective diagrams showing a non-contact IC card.
Figure 14B:
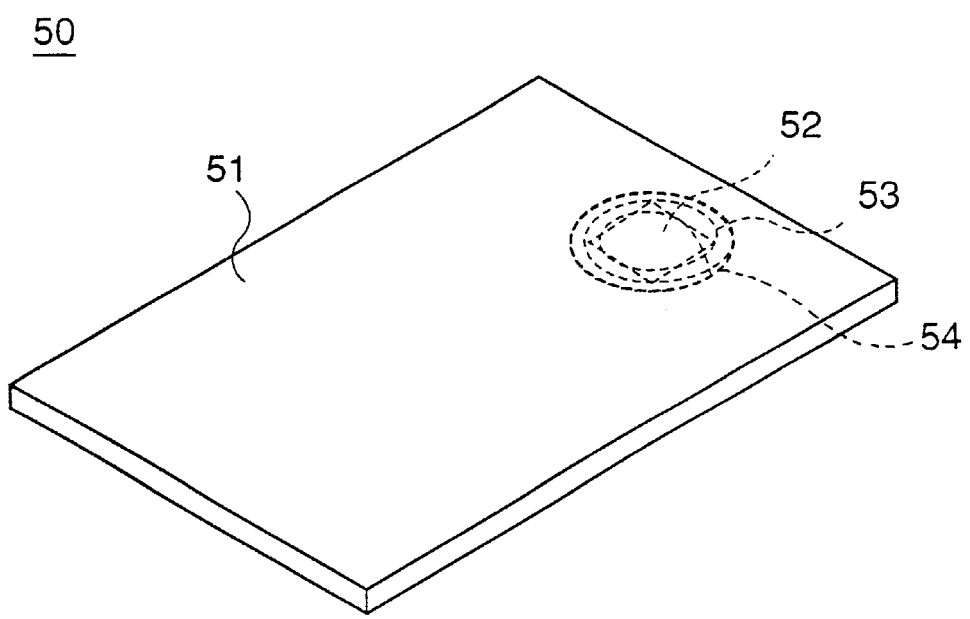

FIGS. 14A and 14B are perspective diagrams showing a non-contact IC card. FIG. 14A is shows an exploded perspective view of the non-contact IC card and FIG. 14B shows an assembled diagram of the non-contact IC card.

The non-contact IC card 50 is formed such that an LSI chip 52 for storing information such as a balance and an antenna 53 for establishing an external communication is embedded in a card main body 51. The non-contact IC card 50 is a so-called adjacent type which is readable by placing a read part 54 having the antenna 53 embedded therein at a distance approximately 2 mm from a reading part of an IC card reader/writer.

The non-contact IC card 50 conforms to, for example, ISO 10536.

Figure 15C:
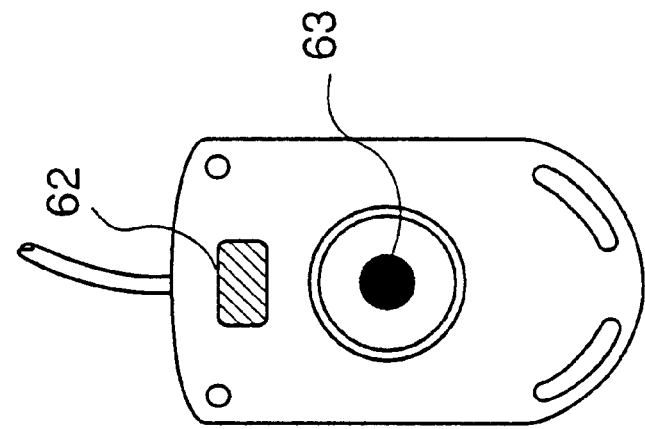
FIGS. 15A to 15C are schematic diagrams showing a second variant of the mouse according to an embodiment of the present invention.
Figure 15B:
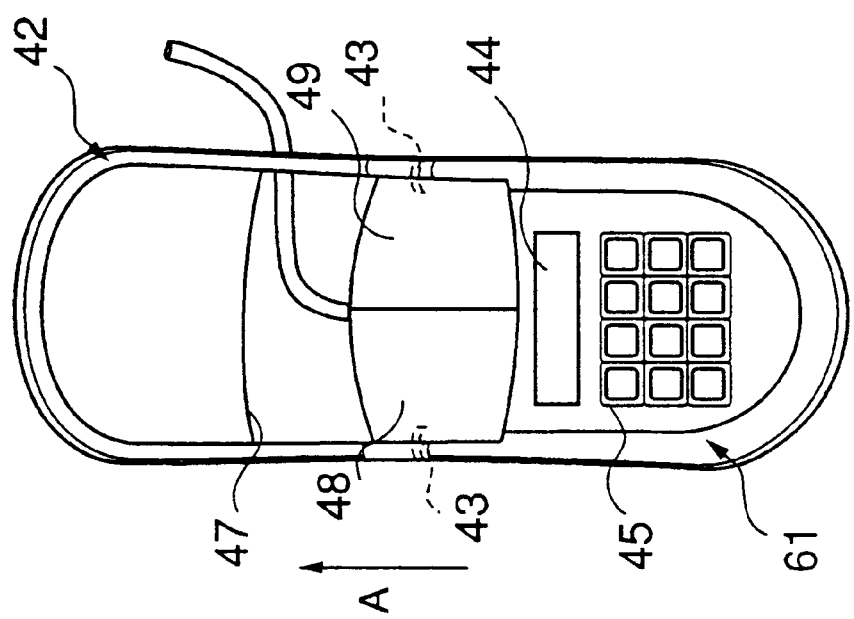
Figure 15A:
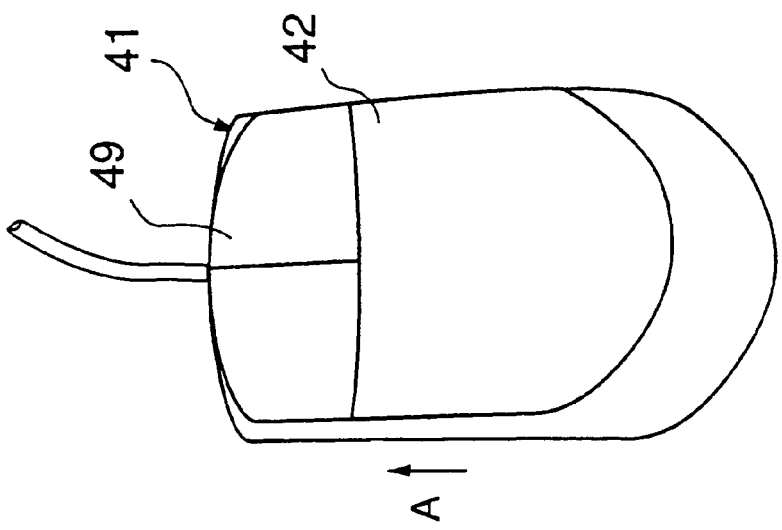

FIGS. 15A to 15C are schematic diagrams showing a second variant of the mouse according to an embodiment of the present invention. FIG. 15A is a plan view of the mouse, FIG. 15B is a plan view of the mouse in a state where the cover is open, and FIG. 15C is a rear plan view of the mouse. In the figures, the same elements as those of FIGS. 13A and 13B are indicated by the same reference numbers.

A mouse 60 of the present variant is provided with an IC reading part 62 at the bottom surface of a mouse main body 61. The IC reading part 62 is an antenna which can allow access to the IC card 50 when placed adjacent to the read part 54 of the non-contact type IC card 50 shown in FIG. 14.

The read part 54 of the IC card 50 and the IC reading part 62 of the mouse 60 need to be opposing each other and, in order to satisfy the standard, to be less than 2 mm apart from each other.

Therefore, in the present variant, in order to locate the read part 54 of the IC card 50 and the IC reading part 62 of the mouse 60 so as to satisfy the above-described reading condition, a mouse pad is used which can also provide a smooth movement of a ball 63 of the mouse 60.

Figure 16A:
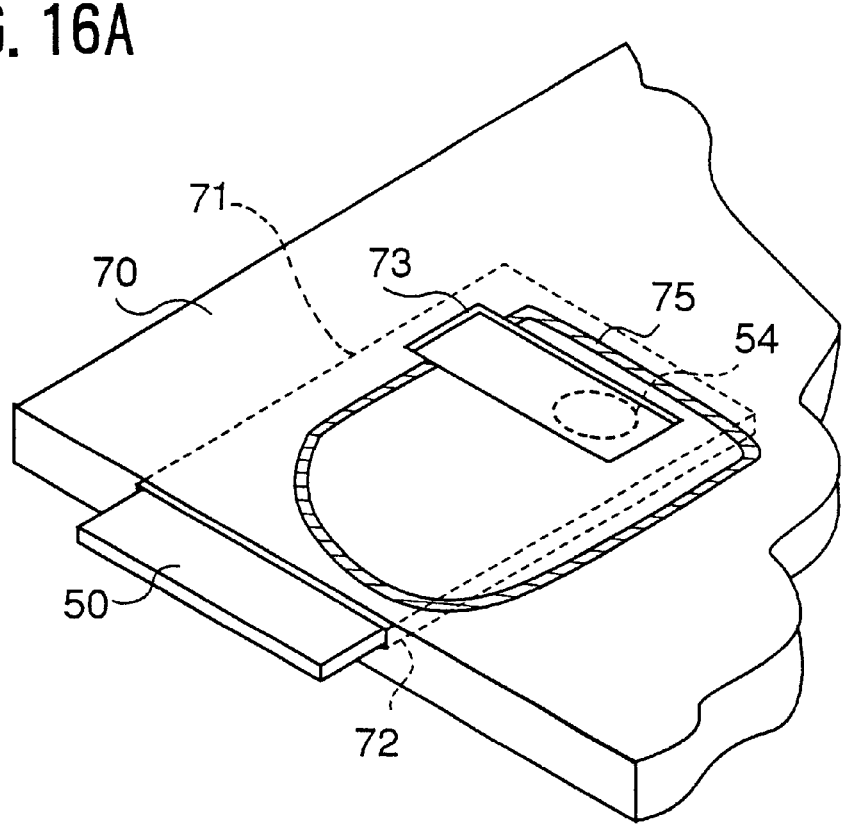
FIGS. 16A and 16B are perspective diagrams of a mouse pad used with the second variant of the mouse according to the embodiment of the present invention.
Figure 16B:
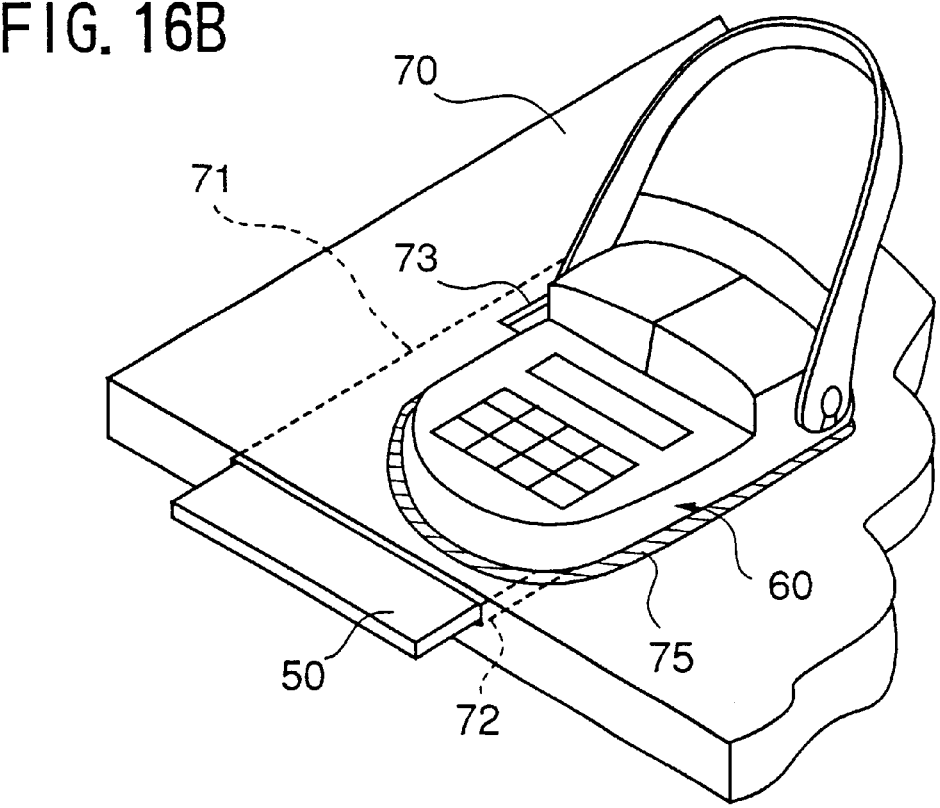

FIGS. 16A and 16B are perspective diagrams of a mouse pad used with the second variant of the mouse according to the embodiment of the present invention. FIG. 16A is a diagram showing the mouse pad with no mouse 60 placed thereon, and FIG. 16B is a diagram showing the mouse pad with the mouse 60 placed thereon.

A mouse pad 70 is formed of, for example, urethane, so as to increase friction against the ball 63 such that the ball 63 positively rotates in association with the movement of the mouse 60. The mouse pad 70 is provided with an IC card holding part 71 for holding the IC card 50.

The IC card holding part 71 is provided with a reading window 73 formed such that the read part 54 of the IC card 50 is exposed when the IC card 50 is inserted into the predetermined position of an IC card insert part 72 from the side of the mouse pad 70 and parallel to the IC card insert part 72. The reading window 73 is formed through a surface of the mouse pad 70 and the IC card insert part 72 so as to expose the read part 54 of the IC card 50 to the surface of the mouse pad 70.

The surface of the mouse pad 70 is provided with a positioning mark 75 for indicating a position of the mouse 60 to be placed during an access to the IC card 50. By placing the mouse 60 at the positioning mark 75 as shown in FIG. 16B, the IC reading part 62 of the mouse 60 and the read part 54 of the IC card 50 oppose each other and are placed adjacent to each other.

When the IC card 50 is not used, the IC card insert part 72 forms a hollow part causing a sink at the surface of the mouse pad 70, which may reduce the operability of the mouse 60. This sink at the surface of the mouse pad 70 may be prevented by inserting a temporary card having a generally the same shape as the IC card in place of the IC card 50.

Also, in order to locate the mouse 60 at a predetermined position, a recessed part or an elevated part may be formed on the surface of the mouse pad 70 according to the shape of the mouse 60 instead of the positioning mark 75.

Further in the present embodiment, the IC card holding part 71 is provided with the IC card insert part 72 and the reading window 73, and the read part 54 of the IC card 50 is exposed from the reading window 73. However, as long as the IC card 50 is securely held in the mouse pad 70, the present embodiment is not limited to the above structure. For example, a recessed part may be formed in the mouse pad so as to engage with the IC card 50.

Figure 17A:
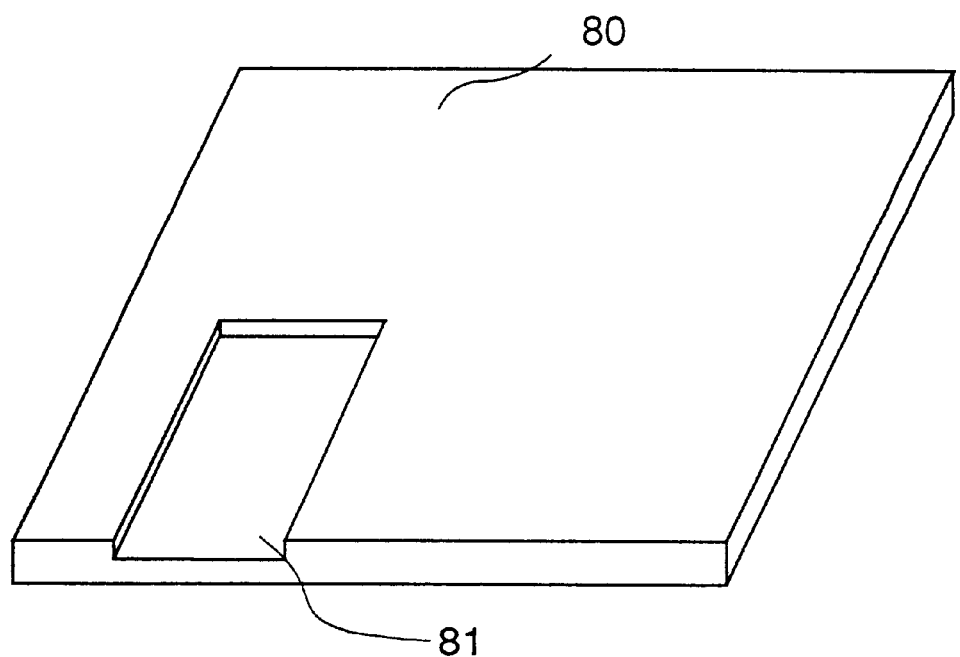
FIGS. 17A and 17B are perspective diagrams of another mouse pad used with the second variant of the mouse according to the embodiment of the present invention.
Figure 17B:
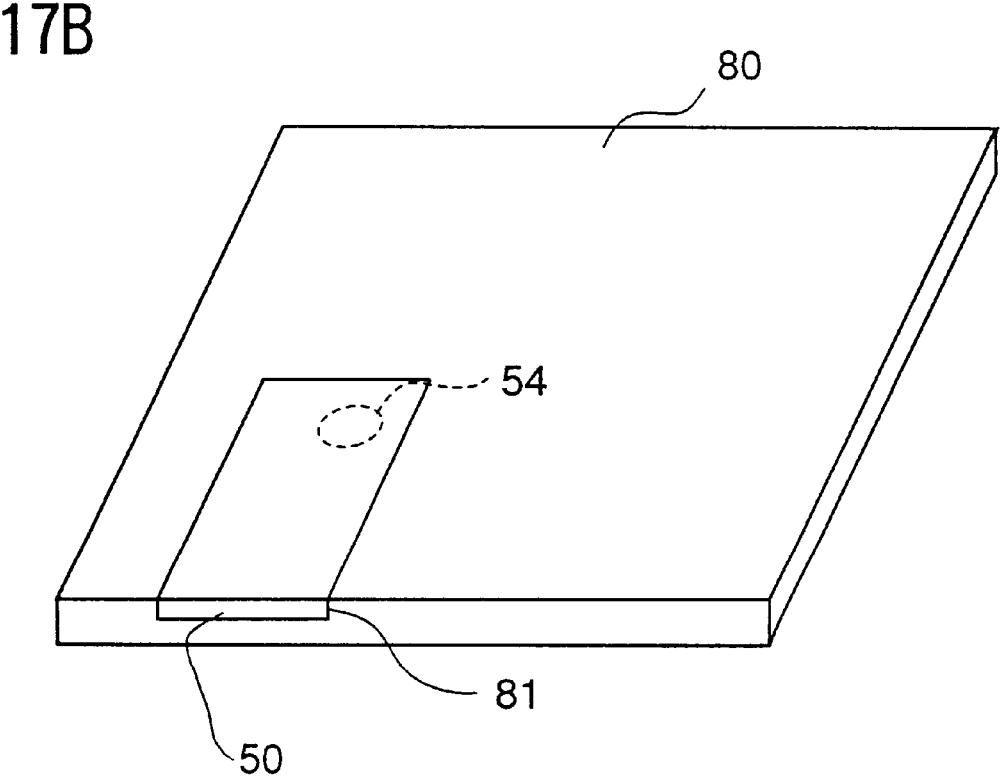

FIGS. 17A and 17B are perspective diagrams of another mouse pad used with the second variant of the mouse according to the embodiment of the present invention. FIG. 17A is a diagram of the mouse pad not holding the IC card 50 and FIG. 17B is a diagram of the mouse pad holding the IC card 50.

A mouse pad 80 of the present variant is provided with a recessed part 81, which is formed so as to engage with the IC card 50.

The recessed part 81 has generally the same shape as the contour of the IC card 50 and may be engaged with the IC card 50. The depth of the recessed part 81 is provided so as to be approximately equal to the thickness of the IC card 50. Thus, when the IC card 50 engages with the recessed part 81, the read part 54 of the IC card 50 generally matches the surface of the mouse pad 80.

By using the mouse pad 80, the read part 54 of the IC card 50 is positioned at the same level as an upper surface of the mouse pad 80. Thereby the read part 54 of the IC card 50 is positioned adjacent to the IC reading part 62 of the mouse 60, which ensures the communication between the IC card 50 and the mouse 60. Also, when the IC card 50 is not used, a temporary card may be engaged with the recessed part 81, which card is formed of the same material as that of the mouse pad 81 and has substantially the same shape as the shape of the IC card. By the above structure, the upper surface of the mouse pad 80 is flattened so that the mouse 60 still maintains a good operation.

In the second variant of the mouse, the IC reading part 62 is provided at the bottom surface of the mouse, but the IC reading part 62 may be provided at the top surface as long as it is placed at a position allowing an access to the IC card 50.

Figure 18:
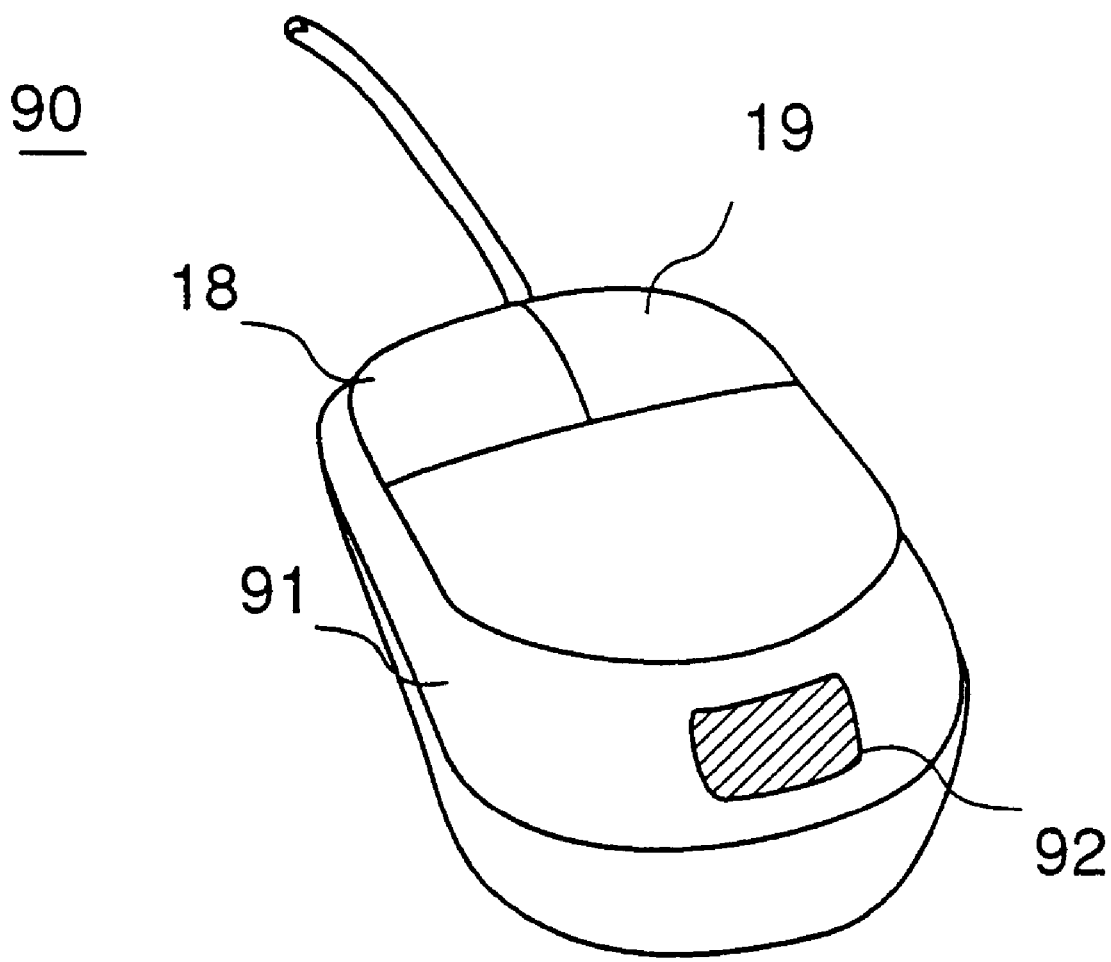
FIG. 18 is a perspective diagram of a third variant of the mouse according to an embodiment of the present invention.

FIG. 18 is a perspective diagram of a third variant of the mouse according to an embodiment of the present invention. In the figure, the same element as those of FIGS. 5A and 5B are indicated by the same reference numbers and will not be described in detail.

A mouse 90 of the present variant is provided with an IC card reading part 92 on a mouse main body 91 for accessing to the IC card 50 by being placed adjacent to the read part 54 of the IC card 50

The mouse 90 of the present variant is not provided with a display part for displaying a content of the IC card 50 or an input key part for inputting an ID. The content of the IC card 50 is displayed on the display 7 of the PC 2 and the ID is input from the keyboard 8 of the PC 2 upon reading. The present variant may be applied simply to a check of the balance, since it is difficult to rewrite information on the IC card 50 using the mouse 90 of the present variant.

As described above, according to the above embodiment, there is no need for the PC 2 to be provided with separate devices such as an IC card reader/writer. Thus, input/output ports of the PC 2 are not occupied by and dedicated to the IC card reader/writer. Therefore, the IC card may be used without reducing extensibility of the PC 2.

Also, the IC card may be used without changing an installation space of the system since there is no need for an installation space for the IC card reader/writer.

Further, with a mouse according to the first and second variants, information stored in the IC card may be checked without starting the PC main body 6 when the PC main body 6 has been turned off, since the mouse is driven by a battery and is provided with a display part and an input key part. That is to say, when the IC card is used as electronic money, the balance may be checked without reducing the security irrespective of the state of operation of the PC main body 6.

The mouses 9 and 40 shown in FIGS. 5A, 5B and FIGS. 13A, B, respectively, are accessible to the contact type IC card 5. It is also possible to use the mouses 9 and 40 shown in FIGS. 5A, 5B and FIGS. 13A, B, respectively, for the non-contact type IC card 50 by providing the electrode 31 and the IC card interface circuit 25 with a structure accessible to the non-contact type IC card 50 as shown in FIGS. 14A, 14B.

Further, the mouse may be of a structure used for both the contact type IC card 5 and the non-contact type IC card 50 by providing an interface which is adapted for both the contact type IC card 5 and the non-contact type IC card 50.

Further, the present invention is not limited to these embodiments, but variations and modifications may be made without departing from the scope of the present invention.

The present application is based on Japanese priority application No. 09-342627 filed on (Dec. 23, 1997 ) the entire contents of which are hereby incorporated by reference.

What is claimed is:

1. A coordinate input device comprising:

coordinate detecting elements for detecting input coordinates;

operating elements;

input key element;

a communication element for transmitting data of said input coordinates detected by said coordinate detecting elements and information generated by said operating elements to a processing device;

an IC card access element allowing an access to an IC card according to data input by said input key element; and a cover which is freely pivotable between an open position and a closed position, provided so as to cover said input key element in said closed position and such that said operating elements are operable both in said open position and in said closed position, wherein said IC card access element is provided on said cover.

2. The coordinate input device as claimed in claim 1, further comprising a display element for displaying information thereon.

3. The coordinate input device as claimed in claim 1, wherein said IC card access element compares said data input by said input key element and data read from said IC card, so as to allow said access to said IC card when said input data and said read data match.

4. The coordinate input device as claimed in claim 1, further comprising a battery for allowing the IC card access element to access said IC card independent of an operation of said processing device.

5. The coordinate input device as claimed in claim 4, further comprising a charging a element for charging said battery by a power supply provided from said processing device to said coordinate input device via said communication element.

6. The coordinate input device as claimed in claim 1, further comprising a transmission control element for connecting said IC card access element to said processing device via said communication element.

7. The coordinate input device as claimed in claim 6, wherein said transmission control element controls communication between said coordinate input device and said processing device and communication between said IC card access element and said processing device in a time-division manner.

8. The coordinate input device as claimed in claim 1, wherein said IC card access element comprises a coupling element for allowing an access to said IC card by coming into contact with a contact part of said IC card.

9. The coordinate input device as claimed in claim 1, wherein said IC card access element comprises a coupling element for allowing an access to the IC card by being coupled to an input/output element of said IC card in a non-contact manner.

10. The coordinate input device as claimed in claim 8, further comprising a holding element for holding said IC card so as to be adjacent to and opposing said coupling element.

* * * * *